(12) United States Patent
Minakawa et al.

(10) Patent No.: US 12,393,897 B2
(45) Date of Patent: Aug. 19, 2025

(54) SERVICE PLAN CHANGE ASSISTANCE APPARATUS, DECISION MODEL CREATION APPARATUS, DECISION MODEL CREATION PROGRAM, AND TRAIN TRAFFIC MANAGEMENT SYSTEM

(71) Applicant: Hitachi, Ltd., Tokyo (JP)

(72) Inventors: Tsuyoshi Minakawa, Tokyo (JP); Yuki Maekawa, Tokyo (JP); Ryota Uematsu, Tokyo (JP); Yuko Yamashita, Tokyo (JP); Yumiko Ishido, Tokyo (JP); Yuichi Kobayashi, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 137 days.

(21) Appl. No.: 18/017,699

(22) PCT Filed: Aug. 25, 2021

(86) PCT No.: PCT/JP2021/031246
§ 371 (c)(1),
(2) Date: Jan. 24, 2023

(87) PCT Pub. No.: WO2022/054585
PCT Pub. Date: Mar. 17, 2022

(65) Prior Publication Data
US 2023/0281532 A1 Sep. 7, 2023

(30) Foreign Application Priority Data
Sep. 11, 2020 (JP) .................. 2020-152621

(51) Int. Cl.
*G06Q 10/06* (2023.01)
*G06Q 10/0631* (2023.01)
*G06Q 50/40* (2024.01)

(52) U.S. Cl.
CPC ....... *G06Q 10/06315* (2013.01); *G06Q 50/40* (2024.01)

(58) Field of Classification Search
CPC ...................................................... G06Q 10/06
(Continued)

(56) References Cited

U.S. PATENT DOCUMENTS

| 2011/0098908 A1* | 4/2011 | Chun .................. B61B 1/00 701/117 |
| 2014/0088865 A1* | 3/2014 | Thies .................. G06Q 10/04 701/465 |
| 2020/0132480 A1* | 4/2020 | Majima .............. G01C 21/3438 |

FOREIGN PATENT DOCUMENTS

| JP | 2019-182342 A | 10/2019 |
| JP | 2019-188868 A | 10/2019 |

(Continued)

OTHER PUBLICATIONS

International Search Report for related International Application No. PCT/JP2021/031246, mailed Nov. 16, 2021, 6 pages.
(Continued)

*Primary Examiner* — Nga B Nguyen
(74) *Attorney, Agent, or Firm* — PROCOPIO, CORY, HARGREAVES & SAVITCH LLP

(57) ABSTRACT

Provided is a service plan change assistance apparatus (110) including: a storage apparatus (13) that stores a decision model in which a service status of each of a delayed train and a to-be-delayed train to be delayed due to the delayed train and train service plan change content for recovering a delay of the to-be-delayed train are associated with each other, in association with a station at which the to-be-delayed train is delayed due to the delayed train; and an arithmetic apparatus (11) that estimates a future train service status based on a train service plan and a train service record before a current time, identifies, from the estimated train service status, the
(Continued)

station at which the to-be-delayed train to be delayed due to the delayed train is standing, inputs information on the estimated train service status to a decision model associated with the identified station to create a service plan change proposal that includes information indicating train service change content for recovering the delay of the to-be-delayed train, and outputs the created service plan change proposal.

8 Claims, 14 Drawing Sheets

(58) Field of Classification Search
USPC .......................................................... 705/7.25
See application file for complete search history.

(56) References Cited

FOREIGN PATENT DOCUMENTS

| JP | 2019-209796 A | 12/2019 |
| JP | 2019-209797 A | 12/2019 |

OTHER PUBLICATIONS

Notice of Reasons for Refusal received in counterpart JP Application No. 2020-152621, drafted Jun. 12, 2023, issued Jun. 20, 2023, in 12 pages, with machine translation.

Extended European Search Report received in counterpart EP Application No. 21866545.3, dated Sep. 10, 2024, in 8 pages.

* cited by examiner

FIG. 6

| DISRUPTION PATTERN | OVERVIEW | DETERMINATION STATION | SERVICE DISRUPTION STATUS | TRAIN AFFECTED BY PLAN CHANGE | PLAN CHANGE CONTENT |
|---|---|---|---|---|---|
| P1 | CHANGE OF ARRIVAL AND DEPARTURE ORDER | STATION AT WHICH DELAY OCCURS DUE TO CROSSING HINDRANCE | THERE IS TRAIN THAT MAY BE DELAYED SINCE TRAIN WAITS DELAYED TRAIN DUE TO CROSSING HINDRANCE | DELAYED TRAIN AND TRAIN THAT WAITS DELAYED TRAIN DUE TO CROSSING HINDRANCE | ORDER IN WHICH CROSSING ROUTES ARE USED IS CHANGED |
| P2 | SHUNTING PLACE CHANGE (SUPERIOR TRAIN IS DELAYED) | SHUNTING STATION FOR LOCAL TRAIN | THERE IS LOCAL TRAIN THAT MAY BE DELAYED SINCE TRAIN WAITS DELAYED SUPERIOR TRAIN | DELAYED TRAIN AND SHUNTED LOCAL TRAIN | SHUNTING STATION FOR LOCAL TRAIN IS CHANGED TO STATION AFTER PLANNED STATION |
| P3 | SHUNTING PLACE CHANGE (LOCAL TRAIN IS DELAYED) | ANY STATION BEFORE SHUNTING STATION FOR DELAYED TRAIN | THERE IS SUPERIOR TRAIN THAT MAY BE DELAYED SINCE TRAIN IS NOT TO OVERTAKE DELAYED LOCAL TRAIN | DELAYED TRAIN AND SUPERIOR TRAIN THAT MAY BE DELAYED | SHUNTING STATION FOR DELAYED TRAIN IS CHANGED TO STATION BEFORE PLANNED STATION |
| P4 | ORDER CHANGE REGARDING TRAIN ORIGINATING FROM STATION | INTERMEDIATE STATION THAT IS STARTING STATION | THERE IS TRAIN THAT ORIGINATES FROM STATION AND MAY BE DELAYED SINCE TRAIN WAITS DELAYED TRAIN | DELAYED TRAIN AND TRAIN THAT ORIGINATES FROM STATION AND MAY BE DELAYED | ORDER IS CHANGED SO THAT TRAIN ORIGINATING FROM STATION DEPARTS FIRST |
| P5 | ORDER CHANGE AT JUNCTION STATION | JUNCTION STATION WITH LINE ON THROUGH SERVICE | THERE IS TRAIN THAT ORIGINATES FROM STATION AND MAY BE DELAYED SINCE TRAIN WAITS ENTRY OF DELAYED THROUGH TRAIN | DELAYED TRAIN AND TRAIN THAT ORIGINATES FROM STATION AND MAY BE DELAYED | ORDER IS CHANGED SO THAT TRAIN ORIGINATING FROM STATION DEPARTS FIRST |

DECISION MODEL DATABASE CREATION PROCESSING

SERVICE PLAN CHANGE ASSISTANCE APPARATUS, DECISION MODEL CREATION APPARATUS, DECISION MODEL CREATION PROGRAM, AND TRAIN TRAFFIC MANAGEMENT SYSTEM

TECHNICAL FIELD

The present invention relates to a service plan change assistance apparatus, a decision model creation apparatus, a decision model creation program, and a train traffic management system.

BACKGROUND ART

Incorporation by Reference

The present application is a 371 of International Application PCT/JP2021/031246, filed Aug. 25, 2021, and claims priority to Japanese patent application No. 2020-152621, filed on Sep. 11, 2020, the content of which is hereby incorporated by reference into this application.

One of train service management tasks is a service plan change task and there are service plan change assistance systems that assist the service plan change task. As technologies related to service plan change assistance systems, there has been known a technology that estimates the service status of each train after a current time on the basis of the run record and service plan of each train obtained by the current time, and automatically creates, when a delay is expected, a service plan change proposal and presents the service plan change proposal to an operator in charge of service management, to thereby provide service plan change task assistance.

With regard to the creation of a service plan change proposal, there have been known a method that obtains an optimum solution by modeling using a set of predetermined constraint conditions related to a train service and an objective function and a method that obtains an optimum solution on the basis of a rule created in advance from task hearing or the like, for example, but it has been difficult to create a service plan change proposal acceptable to an operator for a variety of service disruptions.

The reason for this is as follows, for example: while an operator changes a service plan by taking the flow of passengers based on hours and regional characteristics into consideration to prevent a delay on a congested train line, it is difficult to define an appropriate objective function only from information held by a service plan change assistance system, and in task hearing, an operator can answer points that he/she concerns when changing a service plan, but it is difficult for him/her to clearly express what types of plan changes he/she makes for what situation combinations.

Against this background, Patent Document 1 discloses a technology that creates a model configured to learn a service plan change proposal from a past actual schedule to estimate the necessity of a service plan change based on various situations, estimates the necessity of a service plan change in light of estimation by the model, and presents the estimation result to an operator in charge of service management, to thereby assist the operator in charge of service management.

Specifically, this technology focuses on predetermined trains such as a train for which the necessity of a service plan change is to be estimated and the preceding train thereof, creates a numerical model using the actual values of the delay amounts of the arrivals and departures of those trains at some stations, and performs advance machine learning, to thereby estimate the necessity of a service plan change in the traffic management system.

CITATION LIST

Patent Document

Patent Document 1: JP-2019-188868-A

SUMMARY OF INVENTION

Technical Problem

However, the technology disclosed in Patent Document 1 has a problem in that, when there is a difference due to a timetable revision, a current day's service plan change, or the like between a train service plan used at a time point at which a model has been created and a train service plan at a time point at which the necessity of a service plan change is estimated, the goodness of fit of the created model is low.

The present invention has been made in view of such a current situation, and it is an object thereof to provide a service plan change assistance apparatus, a decision model creation apparatus, a decision model creation program, and a train traffic management system that can create, even when there is a difference between a service plan used at a time point at which a decision model related to a service plan change has been created and a service plan at a time point at which the necessity of a service plan change is estimated, a service plan change proposal close to the one intended by an operator when the decision model has been created.

Solution to Problem

According to one embodiment of the present invention for solving the problem described above, there is provided a service plan change assistance apparatus including: a storage apparatus that stores a decision model in which a service status of each of a delayed train and a to-be-delayed train to be delayed due to the delayed train and train service plan change content for recovering (or reducing; the same holds true hereinafter) a delay of the to-be-delayed train are associated with each other, in association with a station at which the to-be-delayed train is delayed due to the delayed train; and an arithmetic apparatus that executes train service simulation processing of estimating a future train service status based on a train service plan and a train service record before a current time, delay increasing point identification processing of identifying, from the estimated train service status, the station at which the to-be-delayed train to be delayed due to the delayed train is standing, and service plan change proposal creation processing of inputting information on the estimated train service status to a decision model associated with the identified station to create a service plan change proposal that includes information indicating train service change content for recovering a delay of the to-be-delayed train at the identified station, and outputting the created service plan change proposal.

Further, according to another embodiment of the present invention for solving the problem described above, there is provided a decision model creation apparatus including an arithmetic apparatus that executes training data creation processing of creating training data including a delay status of each of a delayed train and a to-be-delayed train to be delayed due to the delayed train and train service plan change content, and parameter adjustment processing of creating, based on the created training data, a decision model in which a service status of each of the delayed train and the to-be-delayed train to be delayed due to the delayed train and train service plan change content for recovering a delay of the to-be-delayed train are associated with each other, in association with a station at which the to-be-delayed train is delayed due to the delayed train.

Further, according to still another embodiment of the present invention for solving the problem described above, there is provided a decision model creation program for causing an information processing apparatus to execute training data creation processing of creating training data including a delay status of each of a delayed train and a to-be-delayed train to be delayed due to the delayed train and train service plan change content, and parameter adjustment processing of creating, based on the created training data, a decision model in which a service status of each of the delayed train and the to-be-delayed train delayed due to the delayed train and train service plan change content for recovering a delay of the to-be-delayed train are associated with each other, in association with a station at which the to-be-delayed train is delayed due to the delayed train.

Further, according to yet another embodiment of the present invention for solving the problem described above, there is provided a train traffic management system including: a service plan change assistance apparatus including a storage apparatus that stores a decision model in which a service status of each of a delayed train and a to-be-delayed train to be delayed due to the delayed train and train service plan change content for recovering a delay of the to-be-delayed train are associated with each other, in association with a station at which the to-be-delayed train is delayed due to the delayed train, and an arithmetic apparatus that executes train service simulation processing of estimating a future train service status based on a train service plan and a train service record in a period before a current time, delay increasing point identification processing of identifying, from the estimated train service status, the station at which the to-be-delayed train to be delayed due to the delayed train is standing, and service plan change proposal creation processing of inputting information on the estimated train service status to a decision model associated with the identified station to create a service plan change proposal that includes information indicating train service change content for recovering a delay of the to-be-delayed train at the identified station, and outputting the created service plan change proposal; and a route control apparatus that controls a train run based on the created new service plan.

Advantageous Effects of Invention

According to the present invention, it is possible to create, even when there is a difference between a service plan used at a time point at which a decision model related to a service plan change has been created and a service plan at a time point at which the necessity of a service plan change is estimated, a service plan change proposal close to the one intended by an operator when the decision model has been created.

Problems, configurations, and effects other than the ones described above are made apparent by the following description of an embodiment.

BRIEF DESCRIPTION OF DRAWINGS

FIG. 6 is a diagram illustrating exemplary correspondences between train service disruption statuses and service plan change content based on the service disruptions in a train traffic management task.

DESCRIPTION OF EMBODIMENTS

Now, an embodiment of the present invention is described with reference to each drawing.

<System Configuration>

Figure 1:
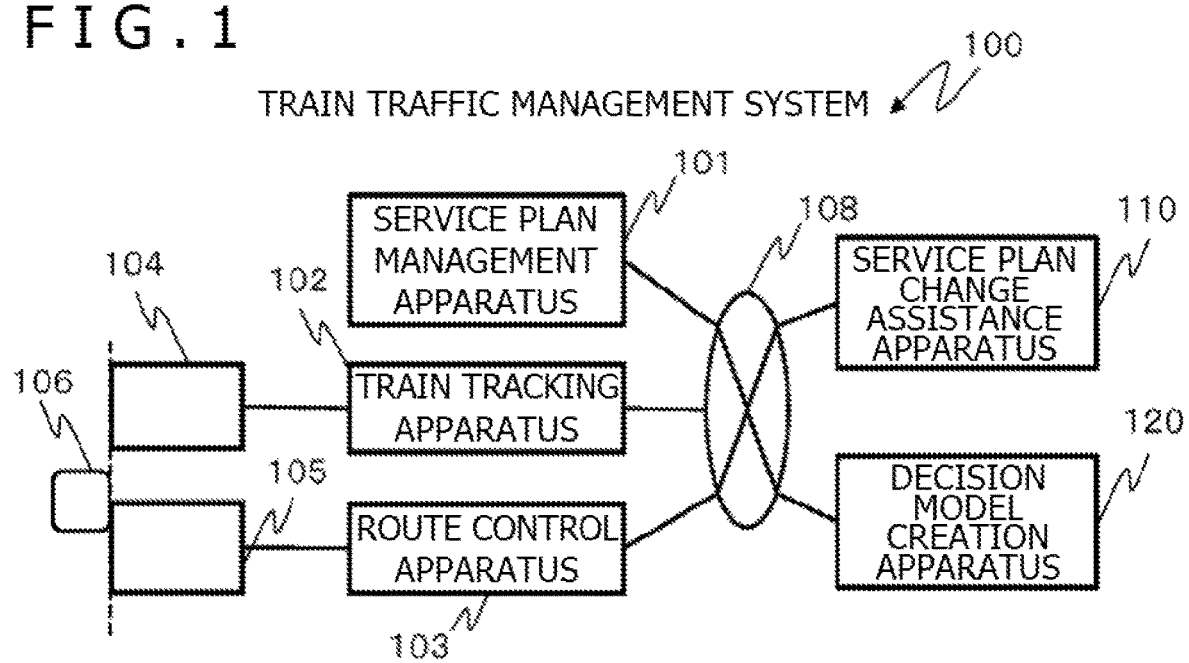
FIG. 1 is a diagram illustrating an exemplary configuration of a train traffic management system according to the present embodiment.

FIG. 1 is a diagram illustrating an exemplary configuration of a train traffic management system 100 according to the present embodiment.

The train traffic management system 100 includes a service plan management apparatus 101 that manages information that is used for train service management, such as the service plan (train schedule or the like) and service record of each train 106, a train tracking apparatus 102 that tracks the run of each train 106 to acquire service records, a route control apparatus 103 that controls the route of each train 106, a service plan change assistance apparatus 110 that assists in changing the service plan of each train 106, and a decision model creation apparatus 120 that creates a decision model (described in detail later) that is used by the service plan change assistance apparatus 110 when creating a train service plan change proposal under the situation where there is a train that may be delayed due to a delayed train (to-be-delayed train). The service plan management apparatus 101 manages, with regard to information that is used for train service management, such as a service plan, a service record, or a plan change history, information on the current day on which service management is being carried out and information on the previous day or earlier. The service plan management apparatus 101 adds, after a train service for one day has ended, information on that day including an original service plan, an all-day service record, and an all-day plan change history to a past history database as past history data and initializes various types of information to prepare for service management for the next day. Specifically, for example, the service plan management apparatus 101 makes an update to a service plan for the next day and resets the service record and the plan change history. Further, the service plan management apparatus 101, when receiving a service plan change proposal from the service plan change assistance apparatus 110, changes a service plan on the basis of the received service plan change proposal and stores, as a plan change history, the received service plan change information and a current time as a set.

The train tracking apparatus 102 acquires, from a line facility or the like 104, vehicle occupancy status information and creates a service record that is information indicating the current day's service history of each train 106 by a current time on the basis of the acquired occupancy status information and a service plan. The train tracking apparatus 102 transmits the created service record to the service plan management apparatus 101.

The route control apparatus 103 transmits, on the basis of the service plan and service record of each train 106, operation instructions to a facility 105 such as a railway signal or a switch, thereby achieving the automatic control of the run (route) of each train 106.

Figure 2:
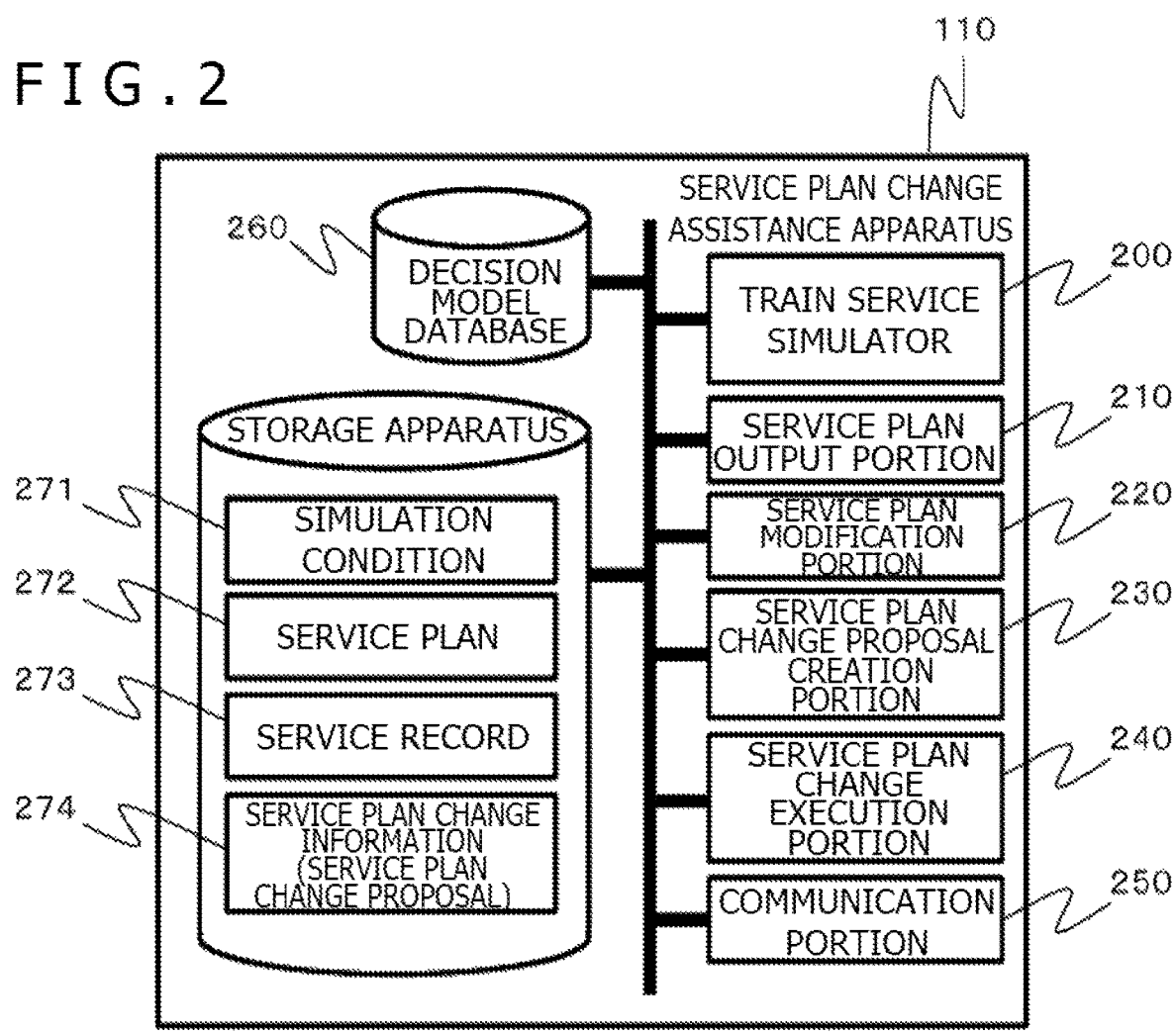
FIG. 2 is a diagram illustrating an exemplary configuration of a service plan change assistance apparatus according to the present embodiment.

The service plan change assistance apparatus 110 changes a service plan and displays the monitoring screen of the service status of each train 106 to present the service status to an operator or the like. The detailed configuration of the service plan change assistance apparatus 110 is described later (FIG. 2).

Figure 3:
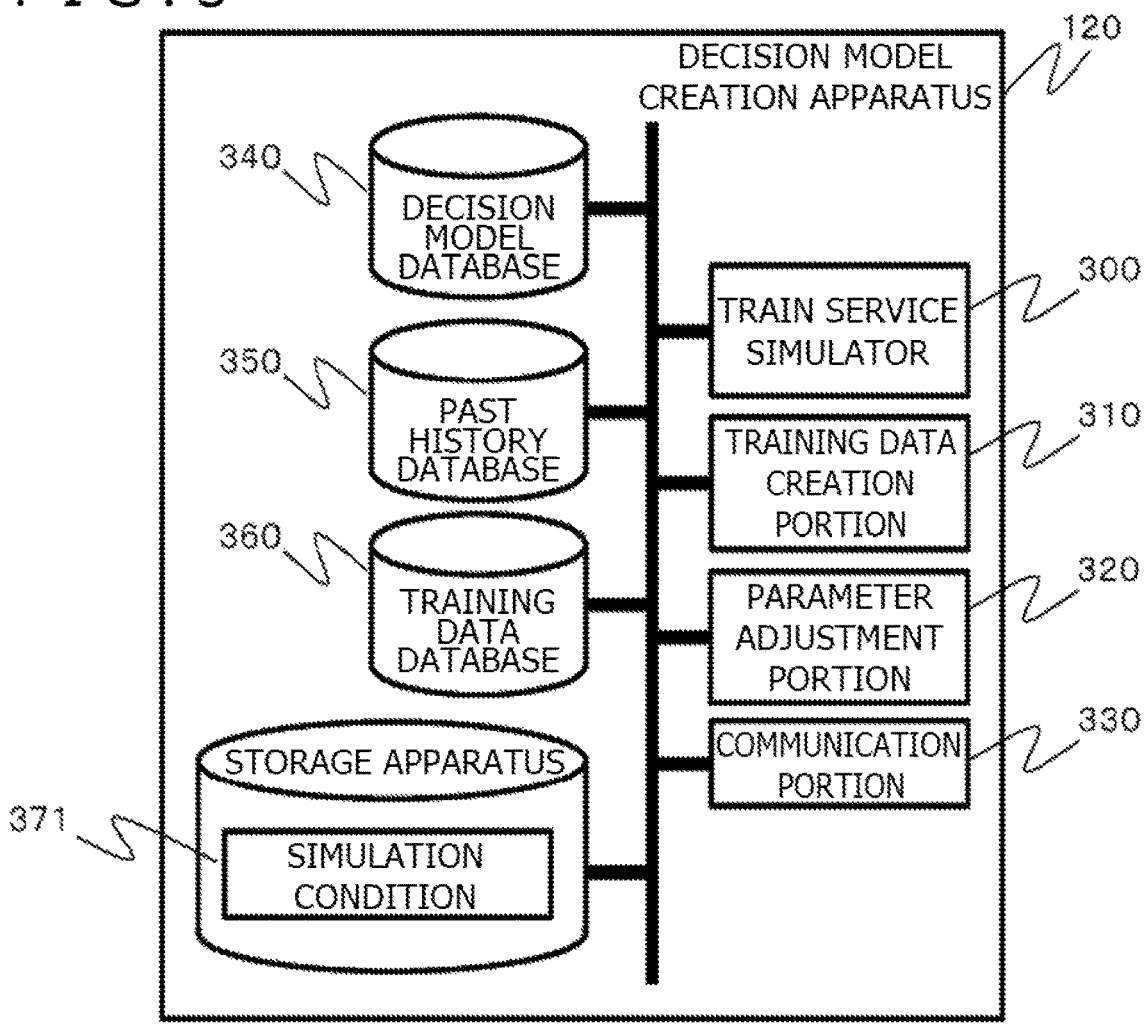
FIG. 3 is a diagram illustrating an exemplary configuration of a decision model creation apparatus according to the present embodiment.

The decision model creation apparatus 120 creates a decision model. A decision model is a numerical model that is used in creating a train service plan change proposal for recovering train service disruptions or the like. In the present embodiment, a decision model is a numerical model including a neural network. The detailed configuration of the decision model creation apparatus 120 is described later (FIG. 3).

Note that, the service plan management apparatus 101, the train tracking apparatus 102, the route control apparatus 103, the service plan change assistance apparatus 110, and the decision model creation apparatus 120 are communicably connected to each other by a wired or wireless communication network 108 such as a communication line (data bus), a leased line, a LAN (Local Area Network), a WAN (Wide Area Network), or the Internet.

<Service Plan Change Assistance Apparatus>

FIG. 2 is a diagram illustrating an exemplary configuration of the service plan change assistance apparatus 110 according to the present embodiment.

The service plan change assistance apparatus 110 stores a simulation condition 271, a service plan 272, a service record 273, and service plan change information 274 in a storage apparatus 13 described later or the like. Further, the service plan change assistance apparatus 110 stores a decision model database 260 having stored therein a decision model.

The simulation condition 271 includes various setting values that are used in executing a train service simulator 200 described later (conditions for program control or the like), such as track layout information. The simulation condition 271 also includes information on the minimum time required for each train to run between adjacent stations and information on the minimum time to be secured between when the preceding train of two trains that are to pass through or stop at the same facility (resource) such as a line track or a platform track in succession has finished using the resource and when the following train starts using the resource. Further, the simulation condition 271 includes information on "current time" that is set to the train service simulator 200. Here, as current time information, for example, the time of a time point at which the train service simulator 200 is executed is set.

The service plan 272 is information obtained by storing the content of a train service plan (train schedule or the like). The service plan 272 includes information on, for example, the arrival time at each station and the departure time from each station of each train, in what order each train uses which facility (resource) when running on a line, and which train services use the same vehicle.

The service record 273 is information obtained by storing the content of a current day's train service until a current time. The service record 273 includes information on, for example, the arrival time at each station and the departure time from each station of each train, in what order each train has used which facility (resource) when running on a line, and which train services have used the same vehicle.

The decision model database 260 is a database having registered therewith one or more decision models and is similar to a decision model database 340 created by the decision model creation apparatus 120. A decision model and the service plan change information 274 are described later.

Further, the service plan change assistance apparatus 110 stores, in addition to those pieces of information, intermediate data that is used for various calculations in the storage apparatus 13 described later or the like.

Note that, the service plan change assistance apparatus 110 updates the service plan 272 and the service record 273 as the occasion demands by acquiring data from the service plan management apparatus 101.

Moreover, the service plan change assistance apparatus 110 includes functional portions (programs) including the train service simulator 200, a service plan output portion 210, a service plan modification portion 220, a service plan change proposal creation portion 230, a service plan change execution portion 240, and a communication portion 250.

The train service simulator 200 estimates, on the basis of the service plan 272 and the service record 273, a train service in a predetermined time range (for example, a time range identified by specifying a duration such as "from a current time until 24 hours later," a time range identified by specifying a predetermined future time such as "from a current time until the end of that day," or a time range identified by specifying a train for which a simulation is performed such as "from a current time until a time by which all train services registered with a service plan end") under the constraint conditions indicated by the simulation condition 271. The train service simulator 200 is, for example, a simulator performing a macro simulation and calculates, with a decision variable being the arrival time at each station or the departure time from each station of each train, those times on the basis of the simulation condition 271. As a train service simulator performing a macro simulation, a train service simulator based on the concept of PERT (Program Evaluation and Review Technique) has been known, for example. Note that, the train service simulator 200 also determines the arrival time at each station or the departure time from each station of each train in the range before a current time on the basis of a service record and outputs the time as part of a simulation result.

The service plan output portion 210 visualizes train service information and presents the train service information to the operator or the like. For example, the service plan output portion 210 displays the content of the service plan 272 and the arithmetic result of the train service simulator 200 on a predetermined screen as a train service table. Further, the service plan output portion 210 displays, on a predetermined screen, a service plan change proposal generated by the service plan change proposal creation portion 230 as information indicating the change of the service plan of a delayed train or a to-be-delayed train for recovering a delay at a delay increasing point, to thereby present the service plan change proposal to the operator.

The service plan modification portion 220 receives information for changing the service plan 272 input from the operator. The service plan modification portion 220 determines the rationality of the input change content by a predetermined algorithm and transmits, when determining that the change content is rational, a change request for requesting the change of the service plan 272 based on the input change content to the service plan change execution portion 240. Specifically, the service plan modification portion 220 converts the input change content to the data format of a service plan change proposal and transmits the resultant to the service plan change execution portion 240.

The service plan change proposal creation portion 230 identifies, from a service status estimated by the train service simulator 200, a point at which the delay of a train increases due to another train (delay increasing point). Then, the service plan change proposal creation portion 230 inputs a train service calculated by the train service simulator 200 to a decision model acquired from the decision model creation apparatus 120, to thereby create a service plan change proposal that is information indicating a train service plan change for recovering the delay at the delay increasing point.

Then, the service plan change proposal creation portion 230 stores the created service plan change proposal as the service plan change proposal information 274. The details of the processing of the service plan change proposal creation portion 230 are described later.

Note that, in the present embodiment, the service plan change information 274 is information in which each service plan change proposal and information indicating the certainty factor (accuracy rate value) of the service plan change proposal are associated with each other. That is, when there are a plurality of service plan change proposals, a set of each of the plurality of service plan change proposals and the accuracy rate thereof is stored as the service plan change information 274. Note that, certainty factor information is not limited to an accuracy rate value and may be other information (for example, a set of information for discriminating a decision model corresponding to service plan change content and the output vector of the decision model).

Further, in the present embodiment, a service plan change proposal is not information on the post-change service plan 272 itself, but information on a difference between the pre-change service plan 272 and the post-change service plan 272 (information on a set of plan change procedures for deriving the post-change service plan 272 from the pre-change service plan 272).

The service plan change execution portion 240 modifies the service plan 272 on the basis of a service plan change proposal included in the service plan change information 274. Further, the service plan change execution portion 240 modifies the service plan 272 on the basis of a service plan change proposal received from the service plan modification portion 220. The service plan change execution portion 240 performs a train service simulation using the train service simulator 200 on the basis of the modified service plan 272 and the simulation condition 271 and outputs the simulation result from the service plan output portion 210 to request the operator or the like to make an approval input. When an approval input is made, the service plan change execution portion 240 transmits the service plan change proposal to the service plan management apparatus 101. The service plan management apparatus 101 changes the service plan on the basis of the received service plan change proposal and stores, as a plan change history, the received service plan change proposal and a current time as a set. When a non-approval input is made, the service plan change execution portion 240 discards the service plan change proposal.

The communication portion 250 transmits or receives data to or from other apparatus in the train traffic management system 100. For example, the communication portion 250 receives, from the decision model creation apparatus 120, a decision model created by the decision model creation apparatus 120. Further, the communication portion 250 receives a service plan and a service record from the service plan management apparatus 101. Further, the communication portion 250 transmits a service plan change proposal to the service plan management apparatus 101.

<Decision Model Creation Apparatus>

FIG. 3 is a diagram illustrating an exemplary configuration of the decision model creation apparatus 120 according to the present embodiment.

The decision model creation apparatus 120 stores information on the decision model database 340 having stored therein one or more decision models, a past history database 350, a training data database 360 having stored therein training data for adjusting the parameters of a decision model, and a simulation condition 371.

Each decision model in the decision model database 340 is information in which the delay status of each of a delayed train and a to-be-delayed train to be delayed due to the delayed train (in the present invention, not a delay time itself with respect to a time on a service plan, but "increased delay time" corresponding to a delay portion due to a delayed train of the delay time of a to-be-delayed train is considered) and a coping method (whether to make a service plan change or not and train service plan change content for recovering the delay of the to-be-delayed train when a change is made) are associated with each other and is created for each station that is a service management target, for example. The details of the decision model are described later. Note that, with regard to a station for which no training data has been created in plan change history-based training data creation processing described later, a result including a service plan change is not obtained from a decision model corresponding to the station, and hence the decision model corresponding to the station is not necessarily held in the decision model database 340.

(Past History Database)

Figure 4:
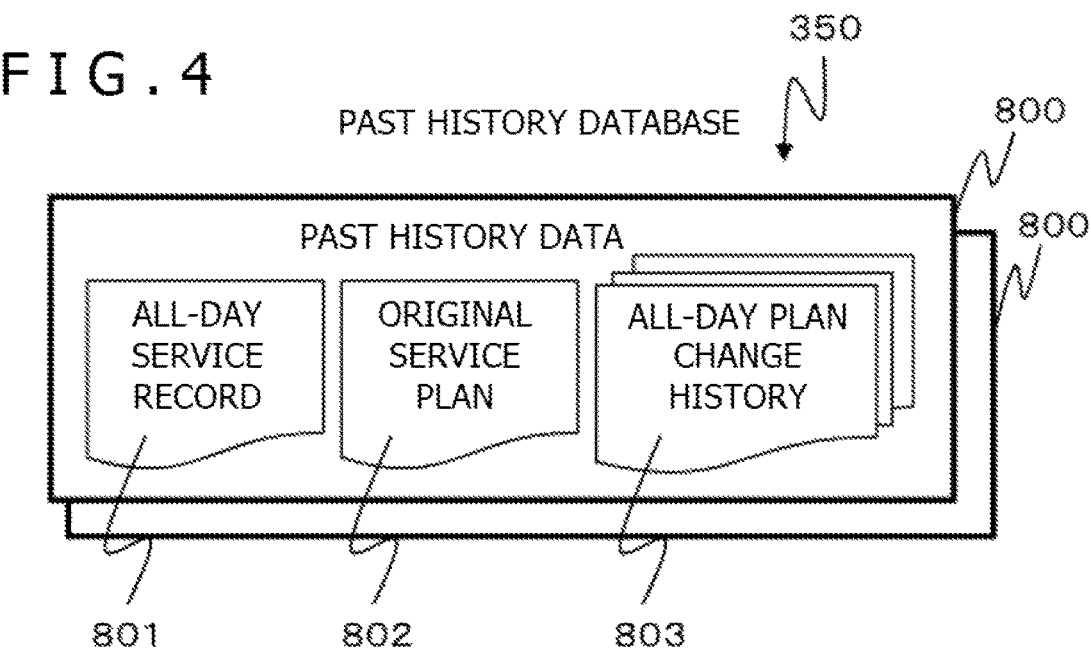
FIG. 4 is a diagram illustrating an exemplary configuration of a past history database according to the present embodiment.

FIG. 4 is a diagram illustrating an exemplary configuration of the past history database 350. The past history database 350 holds one or a plurality of pieces of past history data 800 obtained by recording information on the past one-day service of each train.

The past history data 800 includes an original service plan 802 obtained by recording the service plan of each train at the start time point of a train service on a certain day, an all-day service record 801 obtained by recording the actual service (service record) of each train on that day at the end of that day, and an all-day plan change history 803. The all-day plan change history 803 is, for example, information on the history of service plan changes input by the operator or the like.

Note that, the all-day plan change history 803 indicates the history of service plan changes made (for example, input by the operator or the like) between the start of a train service to the end thereof on that day. In the all-day plan change history 803, for each service change item (for example, train track No. change and order change), information for identifying the specific content of the change (for example, which train has been changed to which track No. at which station or how the order of which trains has been changed from which station to which station) is set together with information on the time at which the change has been input.

Next, as illustrated in FIG. 3, the training data database 360 stores training data for adjusting the parameters of a decision model. The details of the training data are described later.

The simulation condition 371 is information similar to the simulation condition 271 of the service plan change assistance apparatus 110. The simulation condition 371 is stored in the storage apparatus 13 described later, for example.

Further, the decision model creation apparatus 120 stores intermediate data that is used for various calculations in addition to the information described above. Those pieces of intermediate data are stored in the storage apparatus 13 described later, for example.

Next, the decision model creation apparatus 120 includes functional portions (programs) including a train service simulator 300, a training data creation portion 310, a parameter adjustment portion 320, and a communication portion 330.

The train service simulator 300 is similar to the train service simulator 200 of the service plan change assistance apparatus 110.

The training data creation portion 310 creates, on the basis of the whole past history data 800 in the past history database 350, training data for adjusting the parameters of a decision model and stores the created training data in the training data database 360.

The parameter adjustment portion 320 adjusts, on the basis of each piece of training data registered with the training data database 360, the parameter values of each decision model and registers the decision models having the adjusted parameters with the decision model database 340. For example, the parameter adjustment portion 320 optimizes the connection weight and bias of each decision model including a neural network. The processing of the parameter adjustment portion 320 may be carried out using a well-known machine learning technology.

The communication portion 330 transmits or receives data to or from other apparatus in the train traffic management system 100. For example, the communication portion 330 transmits the created decision model database 340 to the decision model database 260 of the service plan change assistance apparatus 110 as the occasion demands. Further, for example, the communication portion 330 receives past history data from the service plan management apparatus 101.

Figure 5:
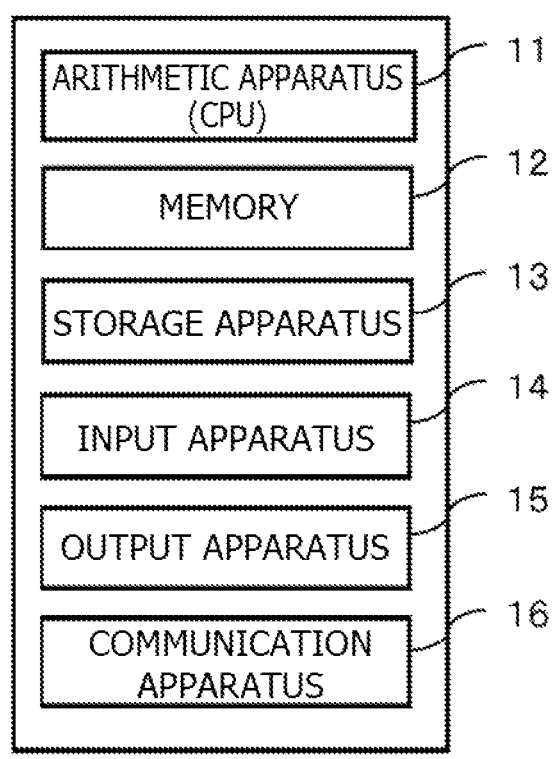
FIG. 5 is a diagram illustrating exemplary hardware included in each information processing apparatus in the train traffic management system.

Here, FIG. 5 is a diagram illustrating exemplary hardware included in each information processing apparatus (service plan management apparatus 101, train tracking apparatus 102, route control apparatus 103, service plan change assistance apparatus 110, and decision model creation apparatus 120) in the train traffic management system 100. Each information processing apparatus includes an arithmetic apparatus 11 such as a CPU (Central Processing Unit), a memory 12 such as a RAM (Random Access Memory) or a ROM (Read Only Memory), a storage apparatus 13 such as an HDD (Hard Disk Drive) or an SSD (Solid State Drive), an input apparatus 14 including a keyboard, a mouse, a touch panel, or the like, an output apparatus 15 including a monitor (display) or the like, and a communication apparatus 16 that communicates with the other information processing apparatus.

The function of each functional portion of each information processing apparatus may be realized by the hardware of each information processing apparatus or by the arithmetic apparatus 11 of each information processing apparatus reading out and executing each program stored in the memory 12 or the storage apparatus 13. Those programs are stored in the storage apparatus 13, other auxiliary storage devices, or an information processing apparatus-readable non-transitory data storage medium such as an IC card, an SD card, or a DVD, for example.

Next, a decision model of the present embodiment is described in detail.

Description of Decision Model

FIG. 6 to FIG. 9 are diagrams illustrating a decision model.

(Service Disruption and Change Pattern of Service Plan)

First, FIG. 6 is a table illustrating exemplary correspondences between train service disruptions and service plan changes based on the service disruptions in a train service management task. In a table 406, coping methods for some small disruptions and medium disruptions are organized.

As illustrated in the table 406, typical service disruption coping methods can be classified into some disruption patterns 400, and each disruption pattern 400 is represented by a determination station 402 that is a station that a train uses and a service disruption status 403 of each train that uses the determination station 402. Then, a service plan change that is made in association with the determination station 402 and the service disruption status 403 is represented by a train 404 affected by the service plan change and service plan change content 405 for the train.

Here, hitherto, when a service disruption is estimated in a train service management task (when the occurrence of the service disruption status 403 related to the determination station 402 is estimated), the operator considers the one or a plurality of disruption patterns 400 corresponding to the service disruption, determines the necessity of a plan change in view of a more detailed situation such as the degree of a delay or an affected range, and then carries out, when determining that a plan change is required, a service plan change corresponding to each selected disruption pattern 400, which is indicated in an overview 401 (achieves the service plan change content 405 for the train 404 affected by the service plan change).

For example, when a train is delayed and there is another train that is not to overtake or is to wait for the delayed train and may thus be delayed (to-be-delayed train) at a certain station (determination station), a service plan change is made to change the shunting station (a station at which one of trains overtakes the other train) for the delayed train or the to-be-delayed train to a station after or before a station set on the original service plan.

Further, for example, when a train is delayed and there is another train the starting station of which is a certain station (determination station) and which may be delayed since the train waits for the delayed train (to-be-delayed train) at the station, a service plan change is made to change the departure order to allow the train that starts from the station to depart first from the station.

The decision model creation apparatus 120 of the present embodiment constructs a decision model for determining the necessity and content of a service plan change. The decision model of the present embodiment is created for each determination station 402 and each service disruption pattern and includes a fully coupled neural network including a plurality of intermediate layers to output, when receiving a service disruption status input in a form in correspondence with each pattern, service plan change content (including change necessity) corresponding to the service disruption status.

When the occurrence of the service disruption status 403 is estimated, the service plan change assistance apparatus 110 makes, using a decision model, a change indicated by the service plan change content 405 on the service plan of the train 404 affected by the service plan change to create a service plan reflecting the change.

Now, data that is input to or output from this decision model is described. Note that, training data for the decision model also has a similar data structure to the input or output data (in training data, however, input data and output data are stored as a set).

(Feature Vector of Decision Model)

Figure 7:
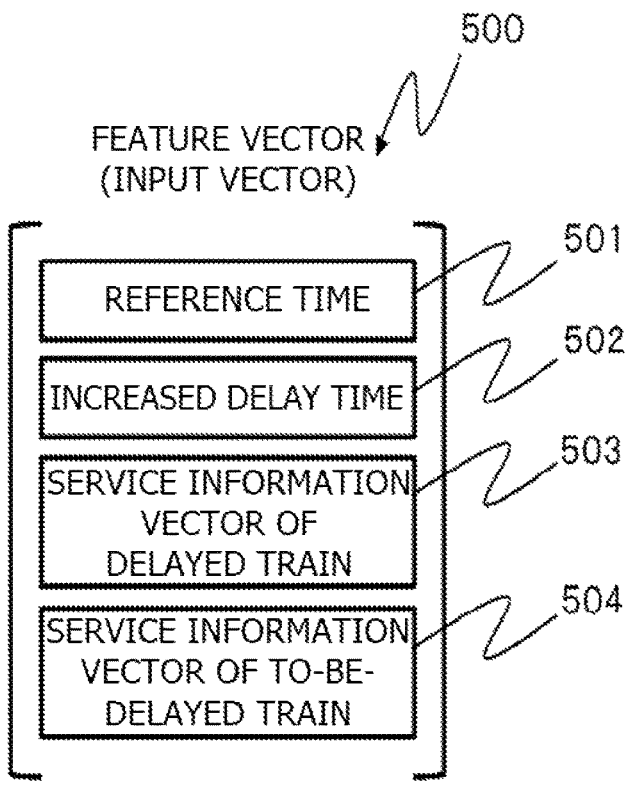
FIG. 7 is a diagram illustrating an exemplary structure of a feature vector that is data to be input to a decision model according to the present embodiment.

FIG. 7 is a diagram illustrating an exemplary structure of a feature vector 500 that is data to be input to the decision model according to the present embodiment.

The feature vector 500 has components including a reference time 501, an increased delay time 502, a delayed train service information vector 503, and a to-be-delayed train service information vector 504.

The reference time 501 is a time that is a reference for a determination on a service plan change. The reference time 501 is set to consider whether service plan change timing is appropriate. As described later, as the reference time 501, for example, a current time (when the reference time 501 is set by the service plan change assistance apparatus 110) or the time at which a service plan change has been determined (when the reference time 501 is set by the decision model creation apparatus 120; for example, the time at which information has been input by the operator or the like) is set.

The increased delay time 502 is a time indicating "how much the delay time of a to-be-delayed train delayed due to a delayed train increases as compared with that in a case where the delayed train is not delayed," that is, the "increment" of a delay time. The increased delay time 502 is set to consider how much the effect of the delay of a delayed train expands. For example, an increased delay time when a train that has already been delayed by two minutes (to-be-delayed train) waits for another train (delayed train) to pass at a shunting station and is thus delayed by another minute is not "3 minutes" but "1 minute."

The delayed train service information vector 503 and the to-be-delayed train service information vector 504 are information indicating the service statuses (on which route a train runs on a service plan, for example) of a delayed train and a to-be-delayed train, respectively (hereinafter referred to as "service information vector"). The delayed train service information vector 503 and the to-be-delayed train service information vector 504 are set to consider the delay status of each of a delayed train and a to-be-delayed train. Note that, the details of the service information vectors are described later.

(Output Vector of Decision Model)

Figure 8:
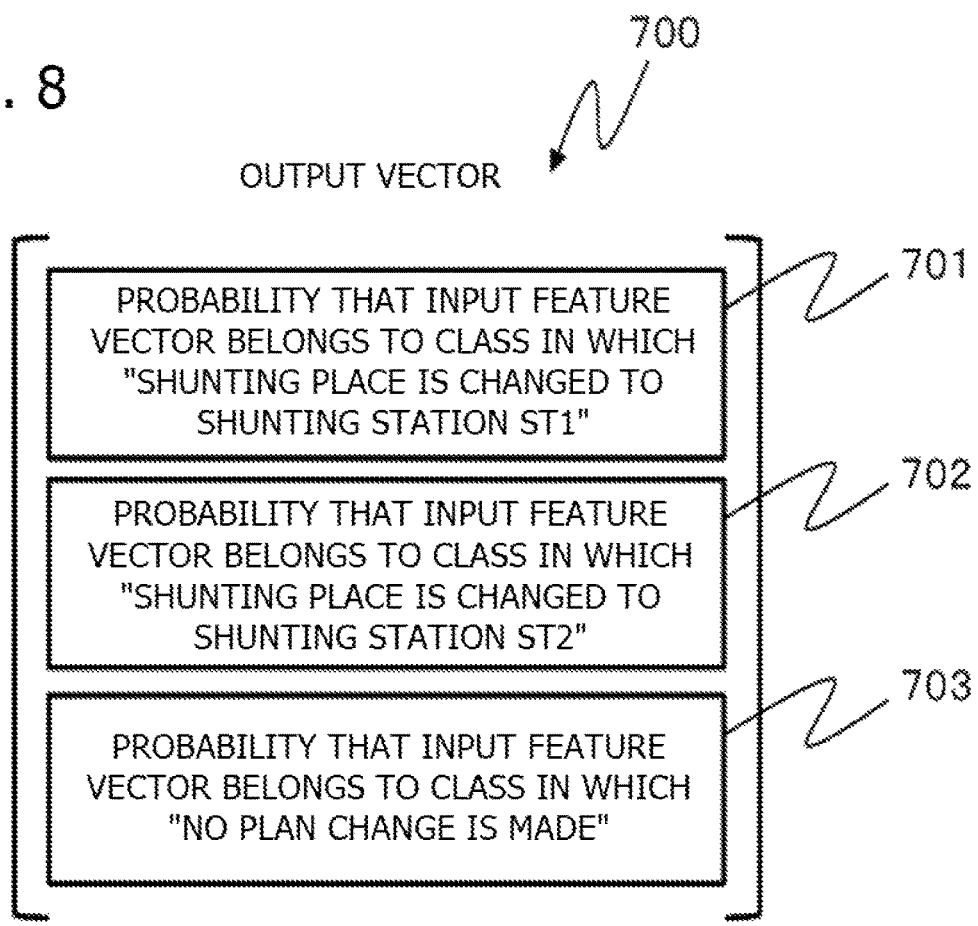
FIG. 8 is a diagram illustrating an exemplary structure of an output vector that is data to be output from the decision model according to the present embodiment.

FIG. 8 is a diagram illustrating an exemplary structure of an output vector 700 that is data to be output from the decision model according to the present embodiment. The example of FIG. 8 is an example of the output vector that a decision model related to a shunting station change outputs. The output vector 700 has a plurality of output elements (accuracy rates) as the output layers of the decision model.

In the example of FIG. 8, the output vector 700 specifically has three output elements, that is, a first element 701 that is a first output value and is a probability that an input feature vector belongs to a class in which "a shunting place is changed to a shunting station ST1," a second element 702 that is a second output value and is a probability that an input feature vector belongs to a class in which "a shunting place is changed to a shunting station ST2," and a third element 703 that is a third output value and is a probability that an input feature vector belongs to a class in which "no plan change is made."

In this way, when there are a plurality of candidates for an alternative shunting station, the output vector 700 of a decision model does not define a class as information on a difference from a pre-change service plan such as "a shunting station change to a station that is n stations before a shunting station on an original plan is made," but defines a class identified by information independent of a pre-change service plan such as "a shunting station change to a shunting station STn is made." With this, for example, even when a service plan is changed due to a train schedule revision, an effect on a decision model whose parameters have been adjusted (subjected to machine learning) before the train schedule revision can be reduced (for example, when there is no facility renovation or the like, relearning based on a service record on the revised train schedule is not required).

Note that, the output vector 700 is an exemplary output related to a shunting station change of service plan changes, but the output vector 700 for other service plan changes (service plan changes illustrated in the table 406) can have a similar structure. For example, the output vector 700 has as many nodes as service plan change content classification items (classes) in the output layers and represents, using a softmax function as the activation function for the output layers of the neural network, a probability that the output of each node to the input feature vector 500 belongs to a predetermined class, and the output of each node indicates the value of each element of the output vector 700. With such a configuration, the output vector 700 probability expresses what is a correct service plan change for a service disruption status indicated by a certain feature vector 500. Note that, in this case, depending on service plan change content, the dimensions of data on the feature vector 500 (input vector) and the output vector 700 corresponding thereto are changed.

(Service Information Vector)

Figure 9:
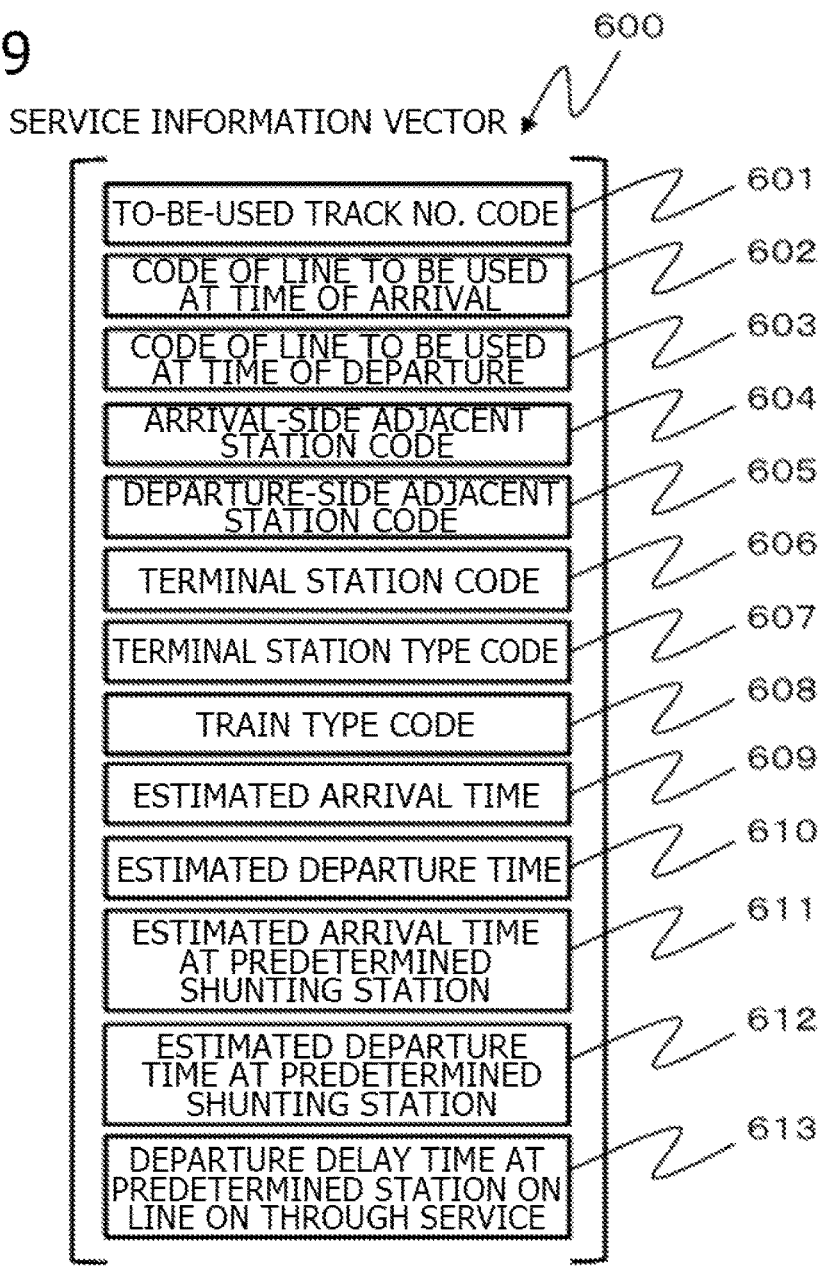
FIG. 9 is a diagram illustrating an exemplary data structure of a service information vector according to the present embodiment.

Next, FIG. 9 is a diagram illustrating an exemplary data structure of a service information vector according to the present embodiment. A service information vector 600 has a to-be-used track No. code 601 of a train (a delayed train or a to-be-delayed train; the same holds true hereinafter), a code of a line used when a train arrives at a determination station 602, a code of a line used when a train departs from a determination station 603, an arrival-side adjacent station code 604 indicating a train arrival-side adjacent station of stations adjacent to a determination station, a departure-side adjacent station code 605 indicating a train departure-side adjacent station of stations adjacent to a determination station, a terminal station code 606 indicating the terminal station of a train, a terminal station type code 607 indicating whether the terminal station of a train is a station on a through service line or not, a train type code 608 indicating the type of a train (accommodation train or express train), an estimated arrival time 609 of a train at a determination station, an estimated departure time 610 of a train from a determination station, an estimated arrival time 611 at a shunting station of a train, an estimated departure time 612 from a shunting station of a train, and a departure delay time 613 of a train at a predetermined station on a through service line.

Note that, the terminal station code 606 is set to consider securing transportation capacity to a terminal station through each station. Further, the estimated arrival time 609, the estimated departure time 610, the estimated arrival time 611 at a shunting station, the estimated departure time 612 from a shunting station, and the departure delay time 613 are set to consider which is a congested train line, whether a headway is appropriate, and the like.

Note that, with regard to the component of the components of the service information vector 600 whose value cannot be set (for example, the estimated arrival time 609 when a determination station is a starting station), a predetermined exception value may be set to the value of the component or a flag indicating whether the value of the component is valid or not may be separately set to facilitate decision model construction by machine learning.

Here, an exemplary service plan change created using this decision model is described.

Figure 10:
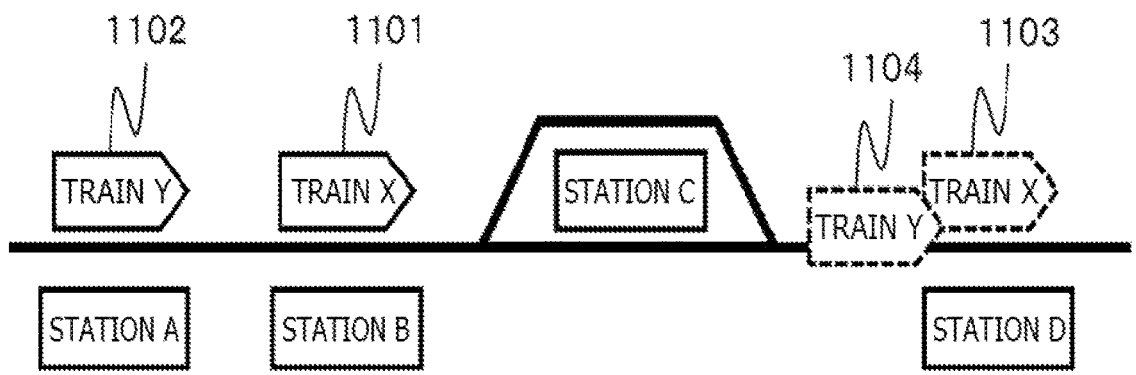
FIG. 10 is a diagram illustrating a train service state before a service plan change.
Figure 11:
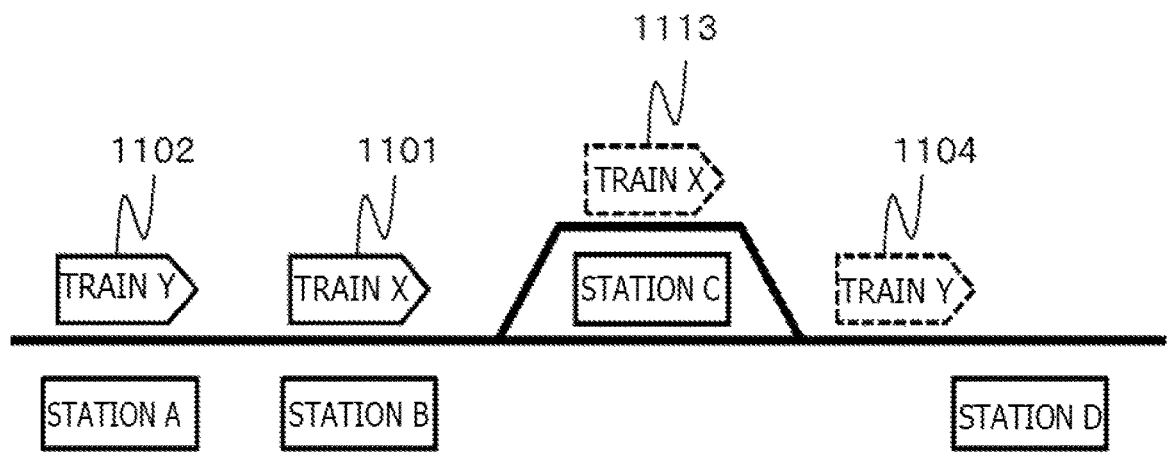
FIG. 11 is a diagram illustrating a train service state after the service plan change.

FIG. 10 and FIG. 11 are diagrams illustrating an exemplary service plan change. FIG. 10 is a diagram illustrating a train service state before the service plan change, and FIG. 11 is a diagram illustrating a train service state after the service plan change.

As illustrated in FIG. 10, in the state before the service plan change, a train X (delayed train) that stops at every station is delayed at a station B (state 1101), and a train Y that is an express train has arrived at a station A on time (state 1102).

At this time, the situation where at a station D (determination station=delay increasing point), the delay of the following train Y (to-be-delayed train) (state 1104) may increase due to the preceding delayed train X (state 1103) is estimated as a result of a train service simulation.

Hitherto, the operator or the like determines, by confirming the situation where the train Y may be delayed at the station D of FIG. 10, whether a service plan change is required or not and creates, when determining that a plan change is required, a service plan change proposal as illustrated in FIG. 11, for example, to avoid an increase in delay of the train Y at the station D. That is, the operator or the like makes a service plan change that achieves a state 1113 in which the shunting station for the train X is set to a station C.

The train traffic management system 100 of the present embodiment uses a decision model to make a determination similar to such a determination by the operator or the like, thereby creating a service plan change proposal. Moreover, to obtain the result of a determination by the decision model similar to the result of a determination by the operator or the like described above, in constructing a decision model by machine learning, training data simulating the determination process by the operator described above is created and the machine learning of the decision model (that is, the adjustment of the parameters of the decision model) is performed. Specifically, in training data database creation processing, when the operator has changed a service plan, training data is not created using a service record based on the post-change service plan, but a service disruption state on the pre-change service plan (FIG. 10) is reproduced and data in which the service state before the change and the service plan change content are associated with each other is created as training data. Further, in the training data database creation processing, when the operator has made no service plan change even under the situation where the delay of the train Y may have increased at the station D, data in which an obtained service record (corresponding to the service state of FIG. 10) and the determination content "no service plan change is made" are associated with each other is created as training data. In this way, the decision model of the present embodiment is created by machine learning on the basis of a situation that the operator grasps when considering making a change from a service state before a change to a service state after the change, and is thus a model closer to the process of a past actual determination by the operator. Note that, in creating training data when the operator has made no service plan change even under the situation where the delay of the train Y may have increased at the station D, training data may be created from a result obtained by performing a train service simulation on the assumption that there is no service record in a period of time after a reference time obtained by predetermined processing. With such a configuration, even when a train service simulation is not very accurate, a situation close to that grasped by the operator can be reproduced to be reflected in training data.

Note that, the exemplary service plan change described above is described using the train line of a train (a polygonal line indicating the service of each train on a train service table is called as "train line").

Figure 12:
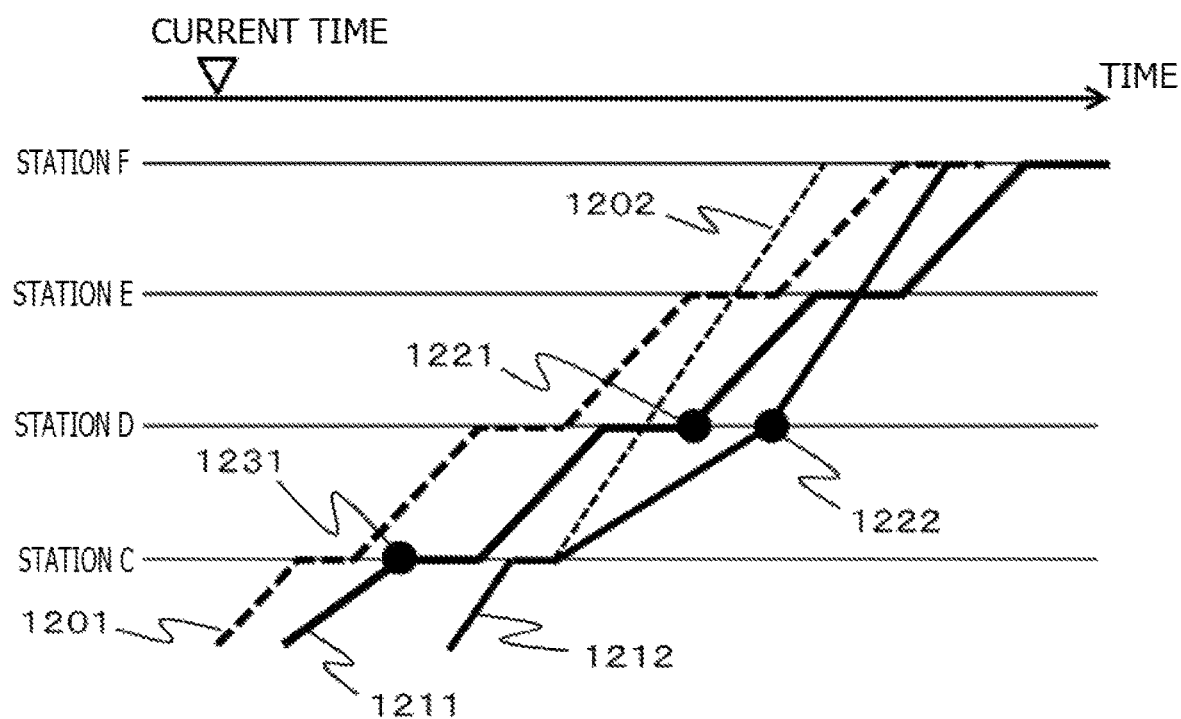
FIG. 12 is a diagram illustrating service plan change content according to the present embodiment with a train service table.

FIG. 12 is a diagram illustrating service plan change content (train service statuses before and after a service plan change) according to the present embodiment with a train service table. FIG. 12 illustrates a similar situation to FIG. 10 and FIG. 11.

In FIG. 12, a first polygonal line 1201 is a train line corresponding to the pre-change service plan of the train X and a second polygonal line 1202 is a train line corresponding to the pre-change service plan of the train Y. Meanwhile, a third polygonal line 1211 is a train line of the train X obtained as a result of a train service simulation by the train service simulator 200 and a fourth polygonal line 1212 is a train line of the train Y obtained as a result of a train service simulation by the train service simulator 200. In this case, since an estimated arrival time 1222 of the train Y at the station D is delayed due to the delay of an estimated departure time 1221 of the train X from the station D, the service plan change assistance apparatus 110 creates, using a decision model for the station D that is a determination station, a service plan change proposal with a shunting station change for a point 1231 at which a service plan change is required (or creates no service plan change proposal when a result "no plan change is made" is obtained since the delay of the estimated arrival time of the train Y due to the train X is small, for example).

Next, processing that is performed in the train traffic management system 100 is described. The train traffic management system 100 executes decision model database creation processing of creating a decision model and service plan change proposal creation processing of creating, when a service disruption occurs, a new service plan by changing the service plan using a decision model created by the decision model database creation processing.

First, the service plan change proposal creation processing is described.

<Service Plan Change Proposal Creation Processing>

Figure 13:
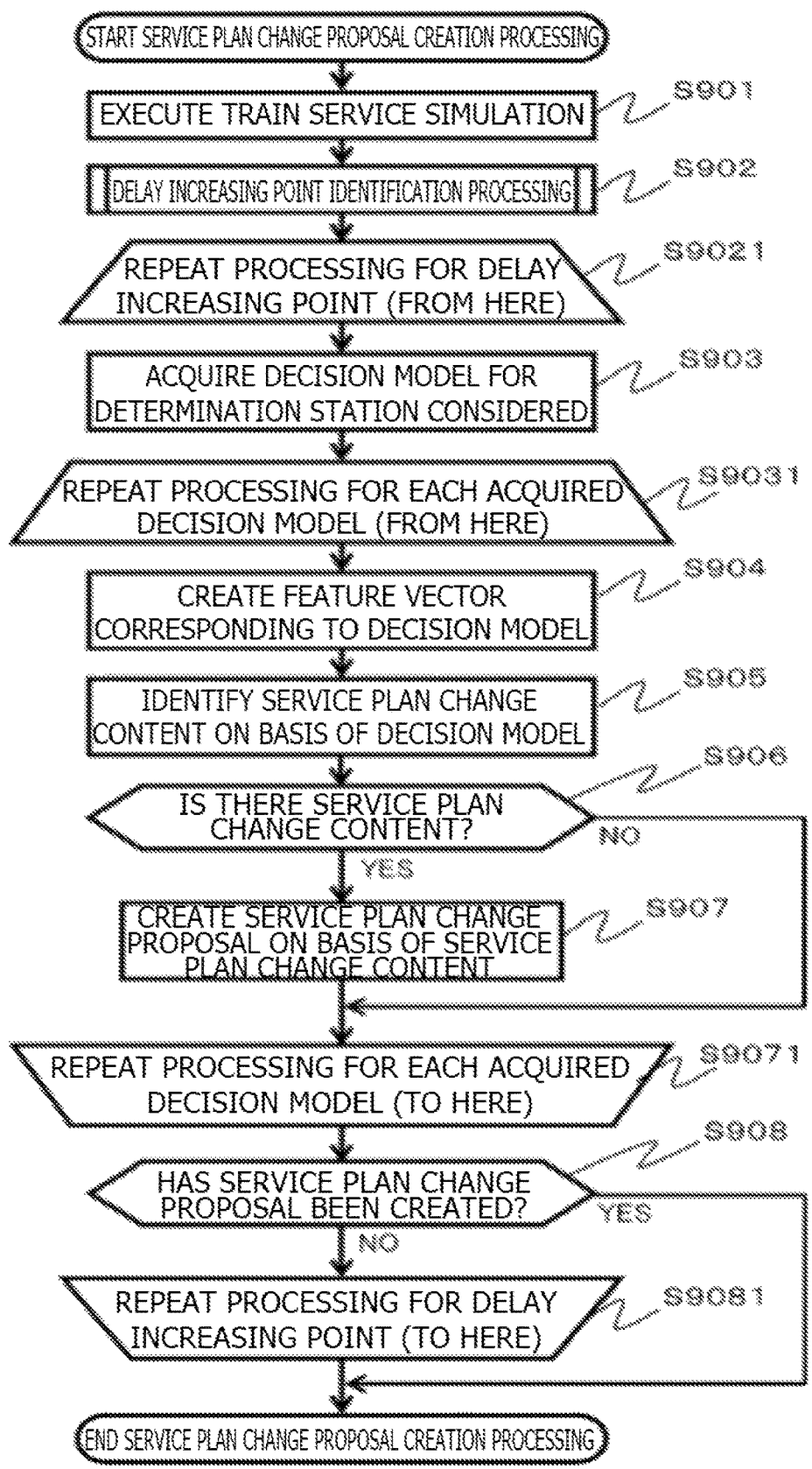
FIG. 13 is a flow chart illustrating an example of service plan change proposal creation processing.

FIG. 13 is a flow chart illustrating an example of the service plan change proposal creation processing. The service plan change proposal creation processing is executed at predetermined time intervals after the service plan change assistance apparatus 110 has received a decision model from the decision model creation apparatus 120, for example. Further, the service plan change proposal creation processing is executed when, for example, the operator or the like determines that a train service disruption may possibly occur and makes a predetermined input to the service plan change assistance apparatus 110.

First, the train service simulator 200 of the service plan change assistance apparatus 110 sets empty information as the service plan change information 274 and then estimates a train service after a current time (Step S901). Specifically, for example, the train service simulator 200 estimates the service of each train after the current time on the basis of the simulation condition 271, the service plan 272, and the service record 273 before the current time that are input data. Note that, the simulation result includes the service of each train before the current time. The value of the train service in the range before the current time may be identified by referring to the service record 273.

Figure 14:
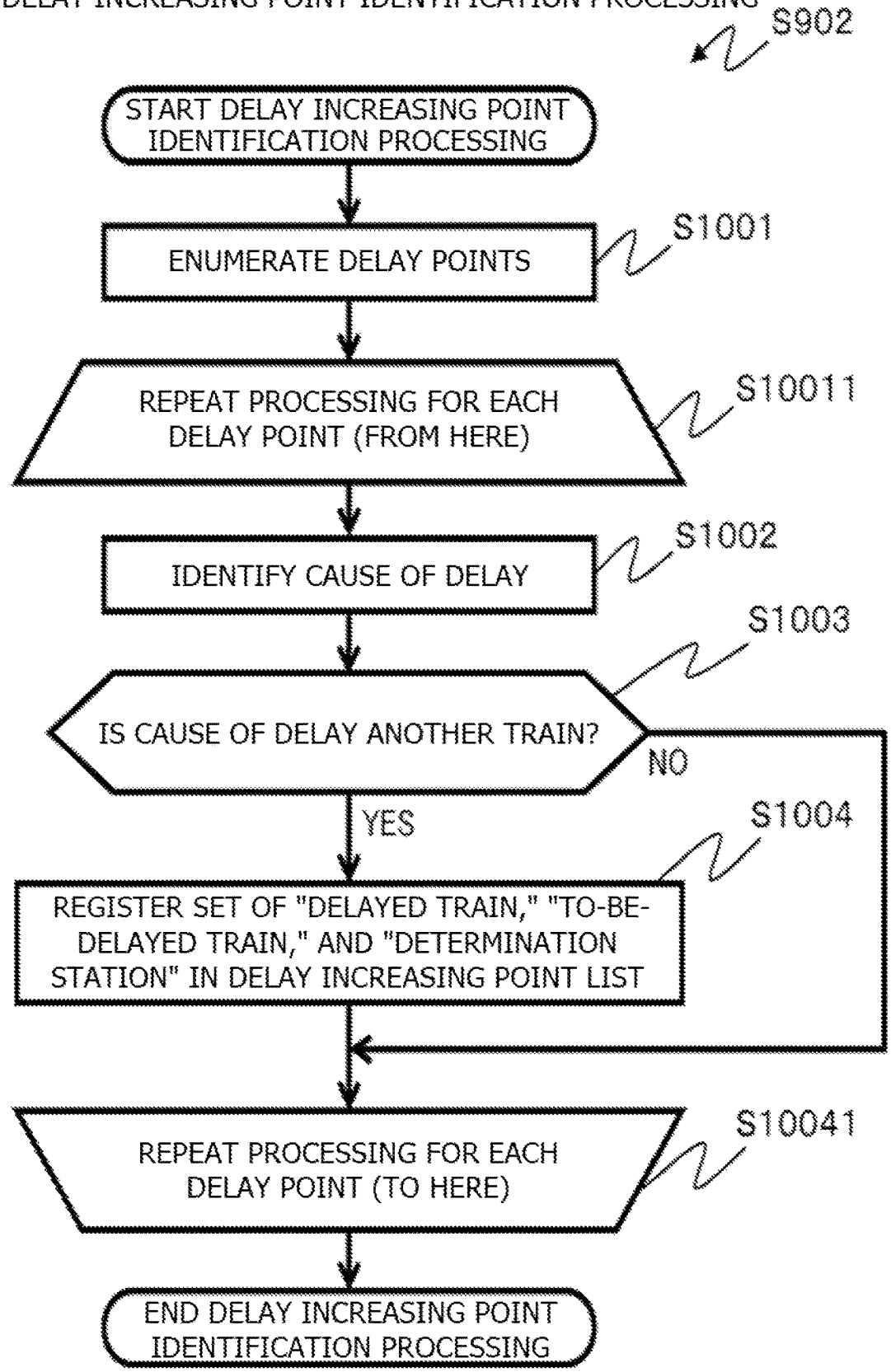
FIG. 14 is a flow chart illustrating an example of delay increasing point identification processing.

The service plan change proposal creation portion 230 performs delay increasing point identification processing of identifying all delay increasing points from the estimated train service information output by the train service simulator 200 in Step S901 (Step S902). Note that, a delay increasing point herein indicates the combination of a delayed train, a to-be-delayed train, and a determination station. The details of the delay increasing point identification processing are described later (FIG. 14).

The service plan change proposal creation portion 230 repeats the processing in Step S903 to Step S908 for each delay increasing point identified in Step S902 (Step S9021 to Step S9081).

That is, first, the service plan change proposal creation portion 230 selects one of the delay increasing points and acquires, from the decision model database 260, all decision models associated with the determination station related to the selected delay increasing point (hereinafter referred to as "selected determination station") (Step S903). Then, the service plan change proposal creation portion 230 repeats the processing in Step S904 to Step S907 for each acquired decision model (Step S9031 to Step S9071).

That is, first, the service plan change proposal creation portion 230 selects one of all the decision models associated with the selected determination station and creates the feature vector 500 corresponding to the decision model selected (hereinafter referred to as "selected decision model") (Step S904). For example, the service plan change proposal creation portion 230 creates the delayed train service information vector 503, the to-be-delayed train service information vector 504, and the increased delay time 502 that are related to the selected decision model corresponding to the selected determination station on the basis of the service estimation on each train output in the train service simulation in Step S901 and the delay increasing points identified in the delay increasing point identification processing in Step S902. Further, the service plan change proposal creation portion 230 sets the current time to the reference time 501 of the feature vector 500.

Then, the service plan change proposal creation portion 230 inputs the created feature vector 500 to the selected decision model to output the output vector 700 (Step S905). That is, the service plan change proposal creation portion 230 acquires service plan change content related to the selected determination station.

The service plan change proposal creation portion 230 refers to the created output vector 700 to determine whether or not there is a service plan change related to the selected determination station (for example, the change of the shunting station for a delayed train) (Step S906).

In a case where there is a service plan change ("YES" in Step S906), the service plan change proposal creation portion 230 executes the processing in Step S907.

On the other hand, in a case where there is no service plan change ("NO" in Step S906), the service plan change proposal creation portion 230 selects another decision model associated with the determination station as a selected decision model and repeats the processing in Step S904 and the following steps for the selected decision model selected (Step S9071). Note that, when the processing in Step S904 to Step S907 ends for all the decision models, the service plan change proposal creation portion 230 executes the processing in Step S908 and the following steps.

In Step S907, the service plan change proposal creation portion 230 creates a service plan change proposal on the basis of the service plan change content identified in Step S905. For example, the service plan change proposal creation portion 230 refers to information indicated by the output vector 700 in which the shunting of each delayed train to each shunting station and the accuracy rate thereof are associated with each other, creates, as a service plan change proposal, the combination of specific service plan changes (a list of service plan changes), such as a track No. change and an order change, corresponding to plan change content corresponding to an element with the highest accuracy rate, and registers the service plan change proposal as the service plan change information 274 together with the accuracy rate. After that, the processing in Step S9071 is performed.

When the processing related to each decision model as described above ends, the service plan change proposal creation portion 230 determines whether a service plan change proposal has been created or not (Step S908). For example, the service plan change proposal creation portion 230 determines whether a service plan change proposal has been registered with the service plan change information 274 or not.

In a case where a service plan change proposal has been created ("YES" in Step S908), the service plan change proposal creation processing ends. After that, the service plan change execution portion 240 reflects the created service plan change proposal in the service plan 272 to create the new service plan 272, performs a train service simulation using the train service simulator 200 on the basis of the created new service plan 272 and the simulation condition 271, and outputs the simulation result from the service plan output portion 210 to request the operator or the like to make an approval input. When an approval input is made, the service plan change execution portion 240 transmits the created service plan change proposal described above to the service plan management apparatus 101. The service plan management apparatus 101 changes the service plan on the basis of the received service plan change proposal and stores, as a plan change history, the received service plan change proposal and the current time as a set. The route control apparatus 103 controls the train 106 on the basis of the service plan changed by the service plan management apparatus 101 (FIG.

On the other hand, in a case where no service plan change proposal has been created, that is, in a case where it is determined that there is no need for a service plan change related to the selected delay increasing point ("NO" in Step S908), the service plan change proposal creation portion 230 selects a determination station related to another delay increasing point as a new selected determination station and repeats the processing in Step S903 and the following steps for the selected determination station selected.

Here, the details of the delay increasing point identification processing (Step S902) are described.

<Delay Increasing Point Identification Processing>

FIG. 14 is a flow chart illustrating the details of the delay increasing point identification processing.

First, the service plan change proposal creation portion 230 identifies, on the basis of output data obtained by the train service simulator 200 executing a simulation (Step S901), all delay points of a train the service record of which has not been confirmed (Step S1001). Then, the service plan change proposal creation portion 230 repeats the processing in Step S1002 to Step S1004 for each identified delay point (Step S10011 to Step S10041).

That is, first, the service plan change proposal creation portion 230 selects one of the delay points and identifies the cause of the delay at the delay point selected (hereinafter referred to as "selected delay point") using the execution result of the train service simulator 200 (Step S1002).

For example, the service plan change proposal creation portion 230 calculates, with regard to the selected delay point, a time margin to each constraint condition (for example, the minimum time to be secured between events) used in obtaining the departure time or arrival time of the train at the selected determination station (event time) (for example, a difference between a time between events calculated by the train service simulator 200 and a time based on the constraint condition) and identifies, as the cause of the delay, the arrival event or departure event of the train associated with a constraint condition related to one of the calculated time margins having the smallest value.

Figure 15:
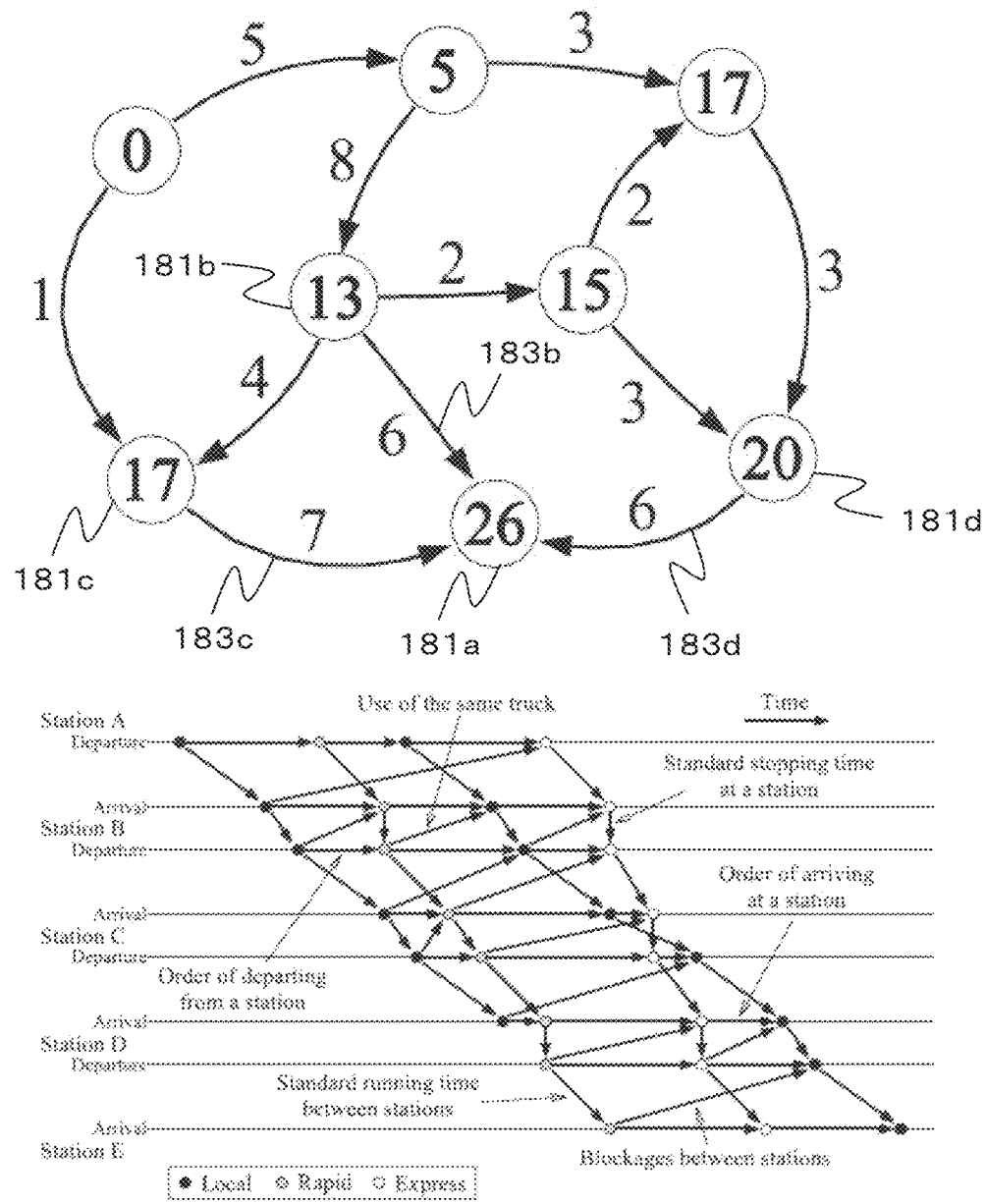
FIG. 15 is a diagram illustrating an exemplary time margin calculation method in a train service simulator performing a macro simulation based on the concept of PERT.

Note that, FIG. 15 is a diagram illustrating an exemplary time margin calculation method in a train service simulator performing a macro simulation based on the concept of PERT (cited from FIG. 2 and FIG. 3 of "Motomu TAKANO, Yusaku NAGASAKI, and Takafumi KOSEKI: "Computer Assisting System to Propose and Evaluate Train-Rescheduling with a Function of Passenger-Path Allocation," the 10th Jointed Railway Technology Symposium, J-Rail 2003, No. 03 to 51, Kanagawa, December 2003, pp. 369 to 372"; note that, the reference symbols and the lead lines are added herein). In the train service simulator performing a macro simulation based on the concept of PERT, a train service plan is modeled as a directed graph with a vertex being the arrival event or departure event of a train at each station and a directed edge being a relation between events as illustrated in FIG. 15. The occurrence time of an event is connected to the node (circled number), and the minimum time to be secured between the occurrence of an event corresponding to a start point-side vertex and the occurrence of an event corresponding to an end point-side vertex is connected to the directed edge. In a train service simulation, the occurrence time of a certain event is determined on the basis of the occurrence time of each event that is the premise of the event and a time connected to a directed edge corresponding to constraint conditions between the events. For example, a time "26" of a vertex 181*a* is determined as "26" that is the biggest time of a time "19" obtained by adding a time "6" of a directed edge 183*b* to a time "13" of a vertex 181*b*, a time "24" obtained by adding a time "7" of a directed edge 183*c* to a time "17" of a vertex 181*c*, and a time "26" obtained by adding a time "6" of a directed edge 183*d* to a time "20" of a vertex 181*d*. Here, the reason why the biggest time is employed is that in simulating a train service, a time to be obtained is required to meet all constraint conditions corresponding to a directed edge, and the earliest time of times meeting all the constraint conditions is considered to be plausible. Here, a time obtained by subtracting, from the time "26" of the vertex 181*a*, a time obtained by adding together the time at the start point-side node of each directed edge and the time of the directed edge is defined as "time margin" corresponding to the directed edge. For example, a time margin corresponding to the directed edge 183*b* is "7" (=26-19) and a time margin corresponding to the directed edge 183*d* is "0" (=26-26). In a case where a time at each node is the result of a train service simulation, there is always a directed edge with a time margin of "0," and when the occurrence of an event on the end point-side of the directed edge is delayed, the cause of the delay can be identified as an event on the start point-side of the directed edge. On the other hand, in a case where a time at each node is a time on a service record, there is not always a directed edge with a time margin of "0" due to the effect of modeling errors or the like. In such a case, an event on the start point-side of a directed edge with the smallest time margin is identified as the cause of a delay. In a case where a plurality of directed edges have the smallest time margin, when events on the start point-sides of those directed edges are events corresponding to the same train, which is another train, the cause of a delay is identified as the other train, and it is otherwise determined that the cause of the delay is not the other train.

Then, as illustrated in FIG. 14, the service plan change proposal creation portion 230 determines whether the cause of the delay is another train or not (Step S1003).

In a case where the cause of the delay is another train ("YES" in Step S1003), the service plan change proposal creation portion 230 stores information on the selected delay point (set of delayed train, to-be-delayed train, and determination station) as one of delay increasing points (Step S1004).

The service plan change proposal creation portion 230 repeats the processing in Step S1002 and the following steps for a new selected delay point that is a delay point that has not been selected so far (Step S10041). When all the delay points have been selected, the service plan change proposal creation portion 230 ends the delay increasing point identification processing in S902.

On the other hand, in a case where the cause of the delay is not another train ("NO" in Step S1003), the service plan change proposal creation portion 230 executes the processing in Step S1041.

Next, a screen that the service plan change assistance apparatus 110 displays in the service plan change proposal creation processing (service plan change proposal presentation screen) is described.

Figure 16:
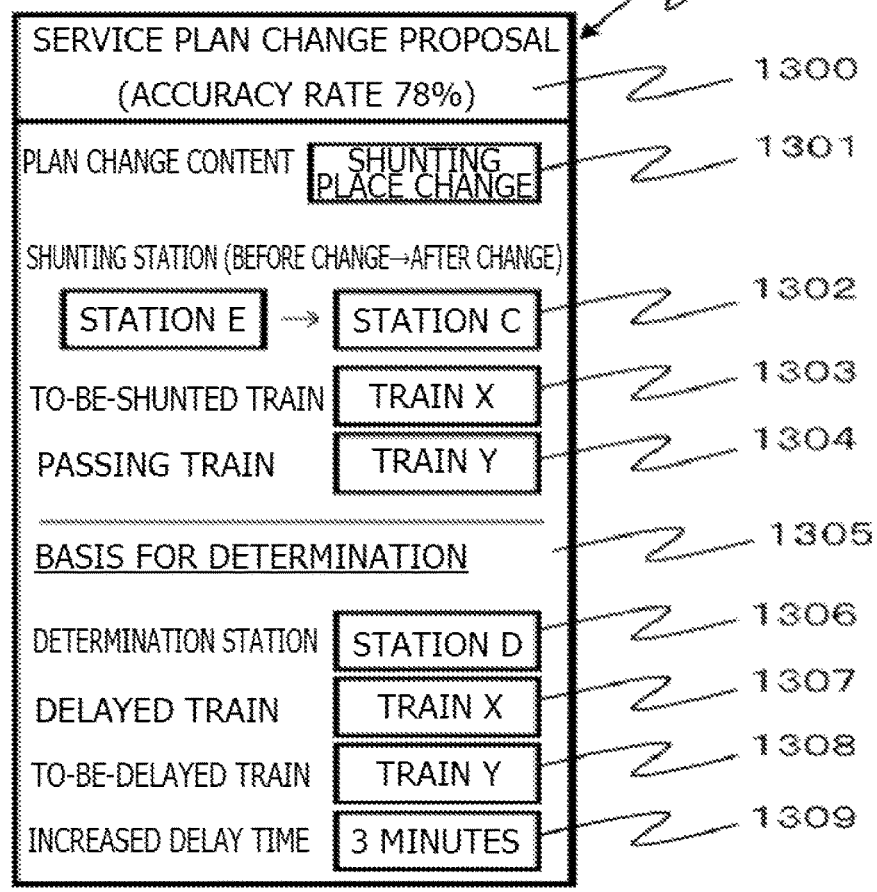
FIG. 16 is a diagram illustrating an example of a service plan change proposal presentation screen.

FIG. 16 is a diagram illustrating an example of a service plan change proposal presentation screen 1310. The service plan change proposal presentation screen 1310 is displayed when the service plan change proposal creation portion 230 has created all service plan change proposals, for example.

The service plan change proposal presentation screen 1310 is a screen displaying the content set of a service plan change proposal with the highest accuracy rate (FIG. 16 illustrates an example of the case of a shunting station change). The service plan change proposal presentation screen 1310 presents a change proposal for achieving a service plan that seems most appropriate in light of a past service record (optimum service plan), to thereby assist the operator in determining a service plan change.

Specifically, the service plan change proposal presentation screen 1310 displays accuracy rate information 1300 that is information on the accuracy rate of a service plan change proposal (in FIG. 16, the accuracy rate of a shunting place change to "station C" of the output values of the output vector 700), plan change content information 1301 that is information on the type of a service plan change proposal, shunting station information 1302 that is information on shunting stations before and after a change, to-be-shunted train information 1303 that is information on a train to be shunted at a shunting station, and passing train information 1304 that is information on a train that passes through a shunting station.

In this way, the service plan change proposal presentation screen 1310 collectively presents, with regard to a train affected by a service plan change, information that the operator needs to perform a task as the plan change content information 1301 instead of individually presenting detailed change content such as a to-be-used track No. change and a run order change, to thereby facilitate a determination on whether a service plan change proposal is appropriate or not by the operator.

Further, the service plan change proposal presentation screen 1310 displays, as determination ground information 1305 that is information on which an optimum service plan calculation is based, determination station information 1306, delayed train information 1307, to-be-delayed train information 1308, and increased delay time information 1309. In this way, in determining an optimum service plan, information indicating what element has been considered in creating a service plan change proposal is displayed instead of detailed determination conditions, to thereby facilitate a determination on whether a service plan change proposal is appropriate or not by the operator.

Next, the decision model database creation processing is described.

<Decision Model Database Creation Processing>

Figure 17:
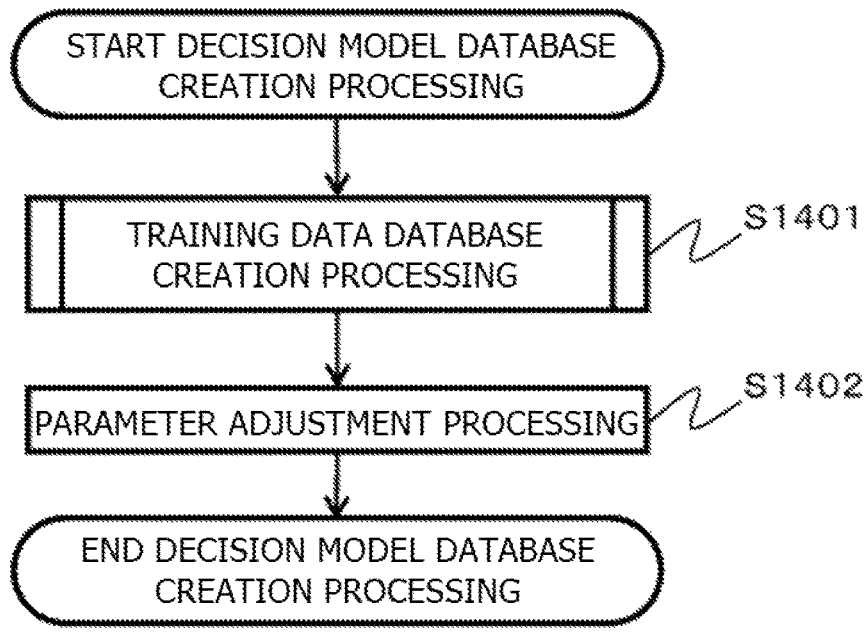
FIG. 17 is a flow chart illustrating an example of decision model database creation processing.

FIG. 17 is a flow chart illustrating an example of the decision model database creation processing. The decision model database creation processing starts, for example, at predetermined time intervals, when a decision model creation request is received from the service plan change assistance apparatus 110, or when the operator or the like inputs a creation command.

The training data creation portion 310 of the decision model creation apparatus 120 executes training data database creation processing of creating training data for a decision model (Step S1401). The details of the training data database creation processing are described later (FIG. 18).

Then, the parameter adjustment portion 320 performs parameter adjustment processing of adjusting the parameters of a decision model on the basis of the training data created in Step S1401 (Step S1402). From the above, the decision model database creation processing ends.

<Training Data Database Creation Processing>

Figure 18:
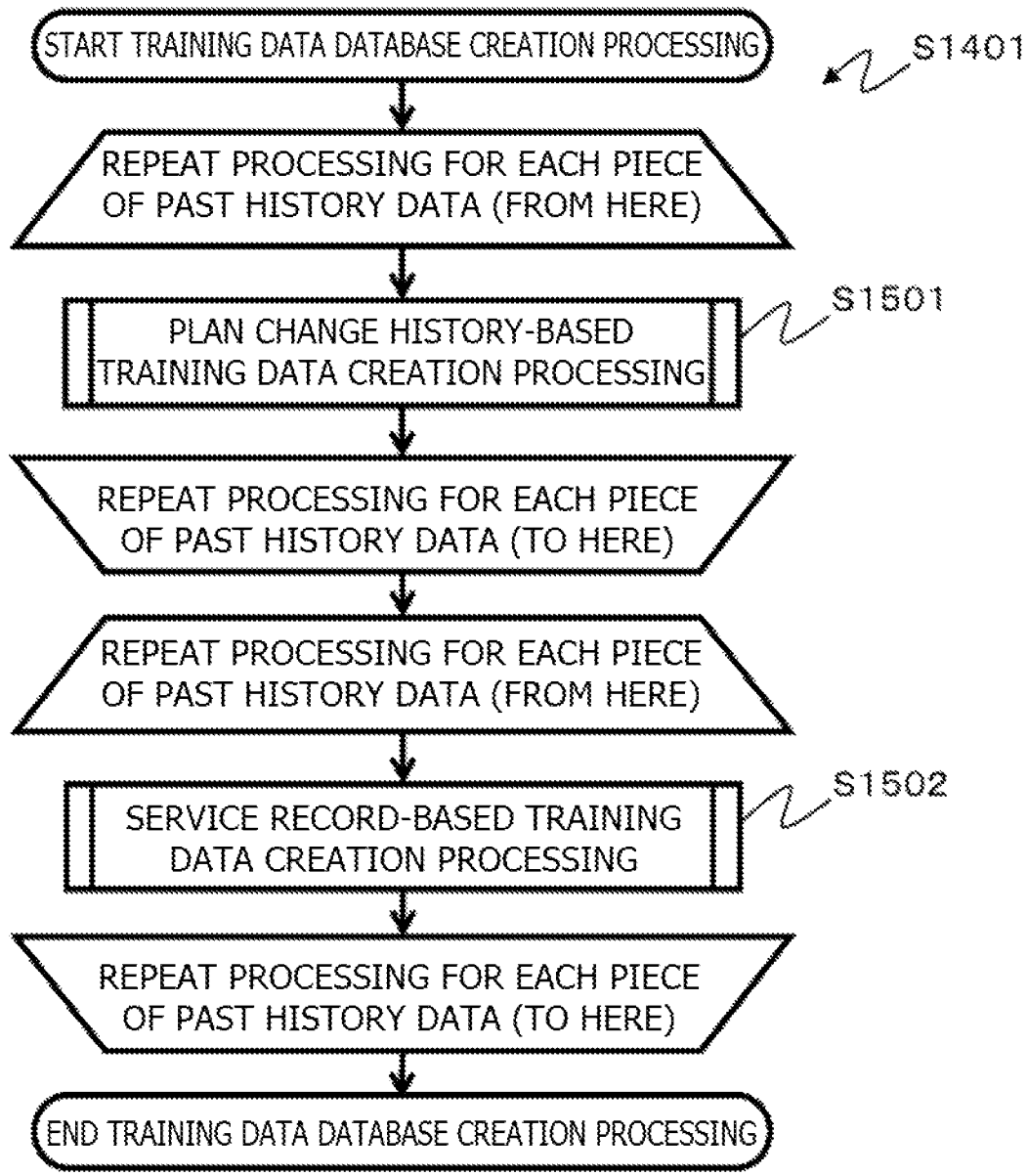
FIG. 18 is a flow chart illustrating the details of training data database creation processing.

FIG. 18 is a flow chart illustrating the details of the training data database creation processing.

The training data creation portion 310 performs the processing in Step S1501 and Step S1502 on each piece of the past history data 800 stored in the past history database 350.

Figure 19:
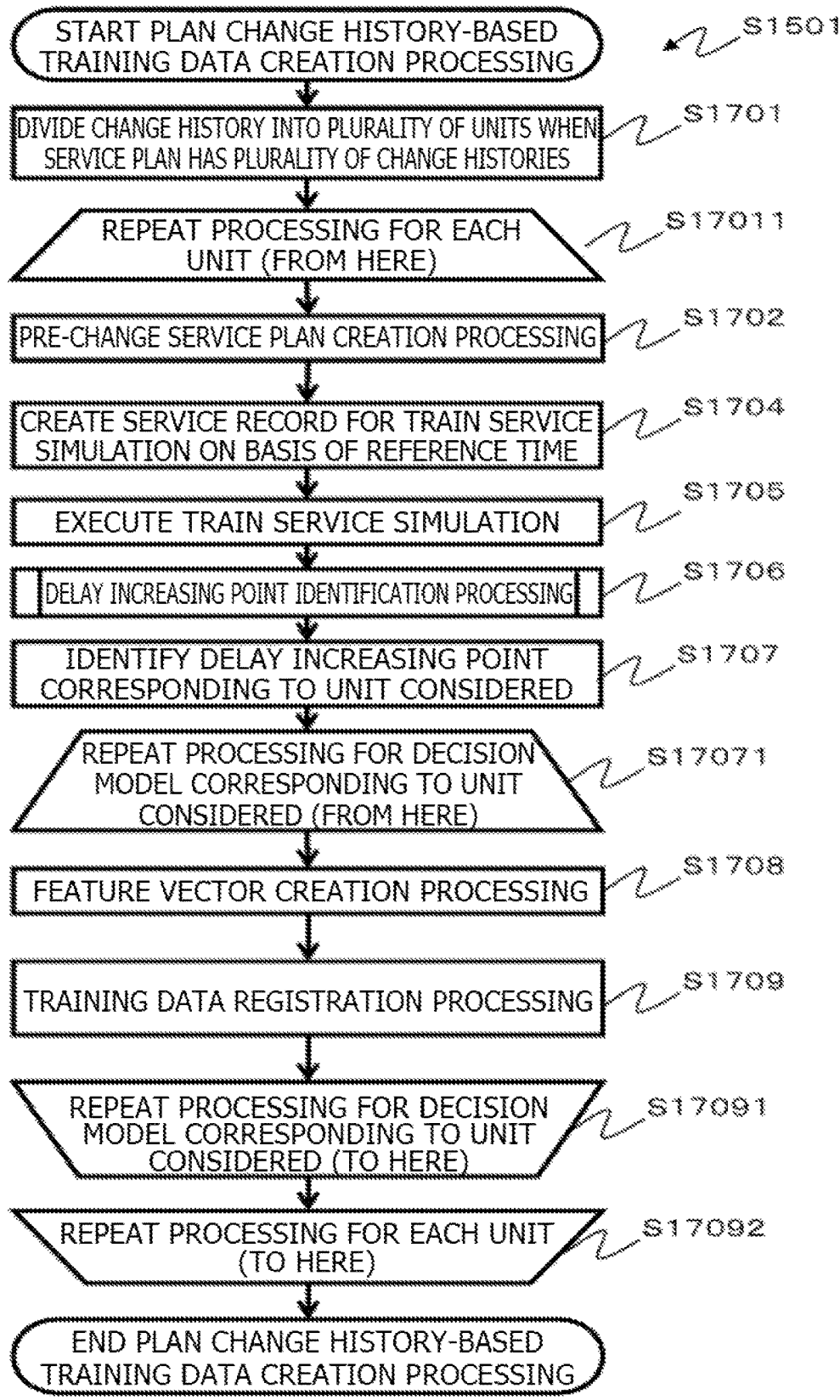
FIG. 19 is a flow chart illustrating the details of plan change history-based training data creation processing.

That is, first, the training data creation portion 310 performs, for each piece of the past history data 800 stored in the past history database 350, plan change history-based training data creation processing of generating training data for training a decision model from a past plan change history (Step S1501). The plan change history-based training data creation processing is the processing of creating training data for learning a train service status when a service plan has been changed since there has been a delay increasing point, in association with the service plan change content. The details of the plan change history-based training data creation processing are described later (FIG. 19).

Figure 20:
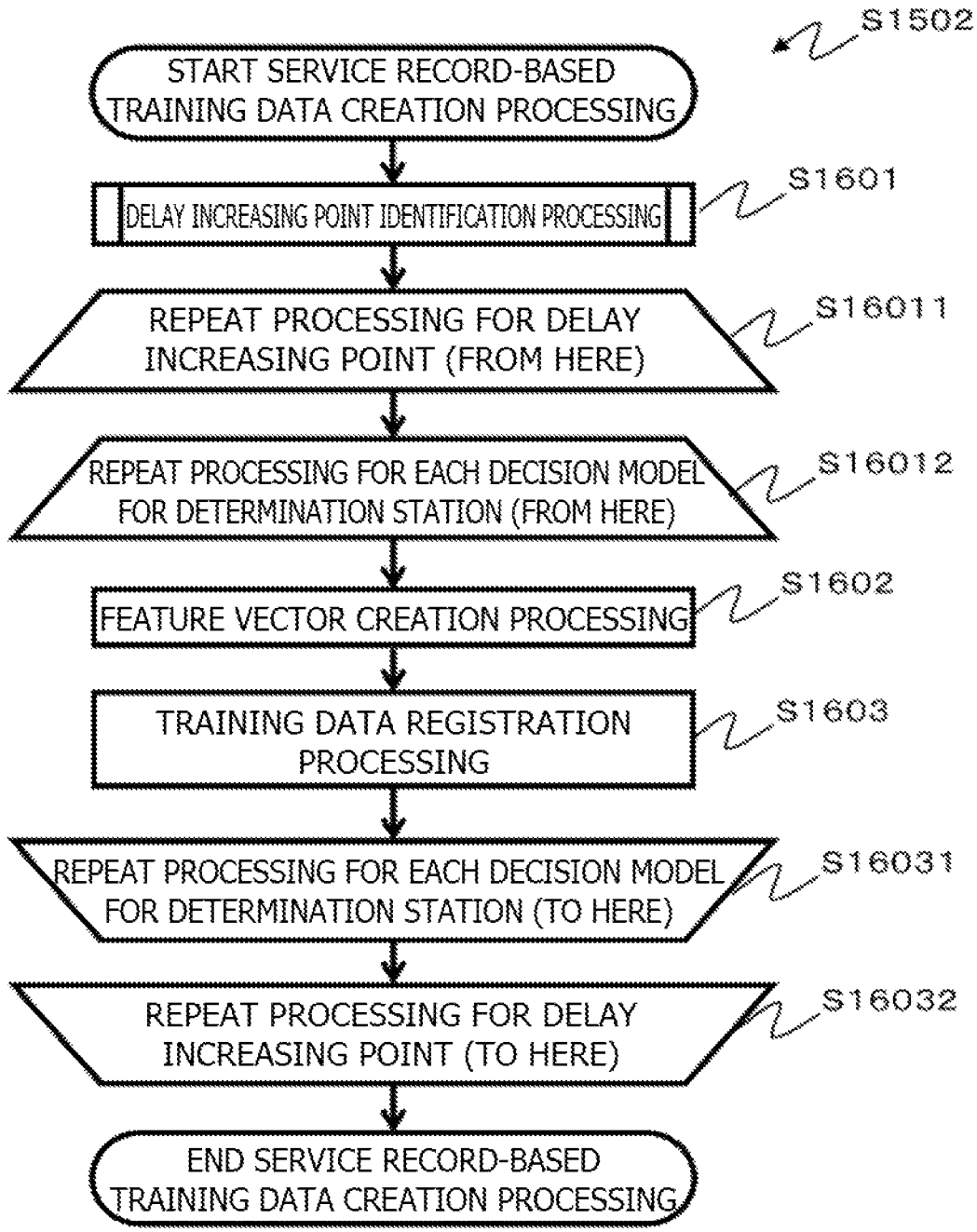
FIG. 20 is a flow chart illustrating the details of service record-based training data creation processing.

Subsequently, the training data creation portion 310 performs, for each piece of the past history data 800 stored in the past history database 350, service record-based training data creation processing of generating training data for training a decision model from a past train service (service record) (Step S1502). The service record-based training data creation processing is the processing of creating training data for learning a train service status when no service plan change has been made although there has been a train delay increasing point. The details of the service record-based training data creation processing are described later (FIG. 20).

Now, the details of the plan change history-based training data creation processing and the service record-based training data creation processing are described.

<Plan Change History-Based Training Data Creation Processing>

FIG. 19 is a flow chart illustrating the details of the plan change history-based training data creation processing.

The training data creation portion 310 first refers to the all-day plan change history 803 of each piece of the past history data 800 in the past history database 350 to identify all portions with service plan changes and divides each identified change portion into a plurality of change portions (unit; for example, "shunting station change") (when there are a plurality of portions with changes) (Step S1701).

For example, the training data creation portion 310 identifies a change portion of making a shunting place change to a station before an original shunting station as follows. That is, the change portion in question has three elements including (element 1) the change of a track No. that the delayed train (train X) has used at a pre-change shunting station, (element 2) the change of a track No. that the delayed train (train X) has used at a post-change shunting station, and (element 3) the change of the order of the delayed train (train X) and the to-be-delayed train (train Y) including determining which train is allowed to depart first from the post-change shunting station to arrive at the pre-change shunting station first. The training data creation portion 310 identifies, from the all-day plan change history 803, a shunting station change satisfying the element 3, determines whether the identified change includes the elements 1 and 2 or not, and stores, when the identified change includes the elements 1 and 2, the three elements described above as a unit "shunting station change" (the reason why the element 3 is used as a reference is that the elements 1 and 2 may be included since a shunting track No. has originally been used to allow another train to overtake). The training data creation portion 310 classifies each service plan change into one of the patterns in order from the change set at an earlier time.

Note that, the training data creation portion 310 may classify a service change portion corresponding to no unit into "unknown." Further, the training data creation portion 310 may also classify a change corresponding to a plurality of units into "unknown." Further, when an interval between the times at which service plan changes have been set is a predetermined time or more, the training data creation portion 310 may refer to the times at which the service plan changes have been input to enhance the accuracy of the division, for example, may determine that the service plan changes belong to units different from each other.

The training data creation portion 310 selects each unit identified in Step S1701 in order from the unit with an earlier time (for example, in order of the input time of a service plan change included in a unit to which the operator has input a service plan change) (hereinafter referred to as "selected unit") and repeats the processing in Step S1702 to Step S1709 for the selected unit (Step S17011 to Step S17092).

That is, first, the training data creation portion 310 performs pre-change service plan creation processing on the selected unit to set service plan data as data to be input to the train service simulator 300 (Step S1702). Specifically, for example, the training data creation portion 310 reflects, in the original service plan 802 of the past history data 800, each service plan change related to each unit including the input time of a service plan change before the input time of a service plan change included in a selected unit. With this, a service plan in the period of time immediately before a service change related to the selected unit is created.

Then, the training data creation portion 310 sets the reference time 501 and sets, on the basis of the set reference time 501, service record data as data to be input to the train service simulator 300 (Step S1704).

Specifically, for example, the training data creation portion 310 sets the earliest time of service plan change times related to a selected unit (the earliest time of the input times of service plan changes in the selected unit) as the reference time 501.

Then, the training data creation portion 310 creates, as service record data to be input to the train service simulator 300, service data representing a service in which there is no service in the future time of the reference time 501 (there is only a service in the previous time of the reference time 501) in the all-day service record 801 of the past history data 800 (service record data). Further, the training data creation portion 310 sets "current time" of the simulation condition 371 that is used in the train service simulator 300 to the reference time.

Then, the training data creation portion 310 executes the train service simulator 300 on the basis of the input data set in Step S1704 to estimate the service of each train (Step S1705). Specifically, the training data creation portion 310 executes the train service simulator 300 using the service plan created in Step S1702 and the service record created in Step S1704 as input data.

Then, the training data creation portion 310 calls the delay increasing point identification processing (Step S902) to identify delay increasing points in the selected unit (Step S1706).

Then, the training data creation portion 310 refers to the all-day plan change history 803 of the past history data 800 and identifies, from the delay increasing points (set of delayed train, to-be-delayed train, and determination station) identified in Step S1706, a delay increasing point corresponding to the selected unit (Step S1707).

Specifically, for example, the training data creation portion 310 identifies which trains are affected by a plan change based on a service plan change corresponding to a selected unit, thereby being capable of identifying a delayed train and a to-be-delayed train. Then, the training data creation portion 310 identifies, of all the identified delay increasing points, a delay increasing point earliest in time of delay increasing points at which the delayed train and the to-be-delayed train are the same.

The training data creation portion 310 repeats the processing in Step S1708 to Step S1709 for each decision model associated with the selected unit (hereinafter referred to as "selected decision model") (Step S17071 to Step S17091).

First, the training data creation portion 310 performs feature vector creation processing (Step S1708). Specifically, for example, the training data creation portion 310 acquires information on the delayed train and the to-be-delayed train that are related to the delay increasing point of the selected unit identified in Step S1707 and creates the feature vector 500 on the basis of the acquired information. At that time, the training data creation portion 310 registers the reference time set in Step S1704 with the reference time 501 of the feature vector 500.

Further, the training data creation portion 310 performs training data registration processing (Step S1709). Specifically, for example, the training data creation portion 310 creates the output vector 700 representing the service plan change related to the selected unit and stores, as training data for a decision model for the determination station related to the delay increasing point of the selected unit (selected decision model), the feature vector 500 created in Step S1708 and the created output vector 700 in the training data database 360 as a set.

The training data creation portion 310 repeats the processing in Step S1708 and Step S1709 for all the decision models and all the units (Step S17091 and Step S17092).

From the above, the plan change history-based training data creation processing ends.

<Service Record-Based Training Data Creation Processing>

FIG. 20 is a flow chart illustrating the details of the service record-based training data creation processing. The training data creation portion 310 refers to, for example, the all-day plan change history 803 of the considered past history data 800 and performs the service record-based training data creation processing when the considered past history data 800 corresponds to a day on which no service plan change has been made.

The training data creation portion 310 calls the delay increasing point identification processing (Step S902) (Step S1601). Specifically, for example, the training data creation portion 310 acquires service record information from the past history data 800 in the past history database 350 and identifies delay increasing points in a train service related to the acquired service record.

The training data creation portion 310 repeats the processing in Step S1602 and Step S1603 for each delay increasing point identified in the delay increasing point identification processing in Step S1601 (selected delay increasing point) (Step S16011 to Step S16032). Specifically, the training data creation portion 310 repeats the processing in Step S1602 and Step S1603 for each decision model corresponding to the selected delay increasing point (determination station) (selected decision model) (Step S16012 to Step S16031).

That is, the training data creation portion 310 performs the feature vector creation processing to create the feature vector 500 (Step S1602). Specifically, for example, the training data creation portion 310 creates the delayed train service information vector 503, the to-be-delayed train service information vector 504, and the increased delay time 502 that are related to the selected decision model corresponding to the selected delay increasing point on the basis of the service record used in Step S1601 and the delay increasing points identified in the delay increasing point identification processing in Step S1601. Further, the training data creation portion 310 sets, to the reference time 501 of the feature vector 500, the time at which it is estimated that the operator or the like determines the necessity of a service plan change.

The reference time 501 is set as follows, for example: when a service plan change is a shunting place change to a station before an original shunting station, the training data creation portion 310 identifies the time at which a delayed train has arrived at the station before the original shunting station on the basis of a past service record, to thereby set the reference time 501. In this case, the training data creation portion 310 may set, by considering a time required for carrying out a service plan change, a time earlier than the time of the service plan change by a predetermined time to the reference time 501. For example, the training data creation portion 310 sets, to the reference time 501, a time considering, as a margin, a time required for coordination between the departments for carrying out shunting (a time from which the margin has been subtracted). Note that, the training data creation portion 310 may obtain, when there is a plan change history related to a service plan change pattern of the same type for the same determination station, a reference time on the basis of the plan change history. For example, the training data creation portion 310 may obtain, when there is a plan change history related to a service plan change pattern of the same type for the same determination station, the average difference value between the arrival time of a delayed train at the determination station and the reference time (excluding an outlier) in the history of plan changes, and may set a time calculated by subtracting the obtained average value from the arrival time of the delayed train at the current selected delay increasing point as the reference time 501.

Subsequently, the training data creation portion 310 performs the training data registration processing to create the output vector 700 (Step S1603). Specifically, the training data creation portion 310 creates the output vector 700 indicating that no train rescheduling has been performed on the delayed train and the to-be-delayed train that are related to the selected delay increasing point and stores, as training data for the selected decision model, the feature vector 500 created in Step S1602 and the created output vector 700 in the training data database 360 as a set.

The training data creation portion 310 repeats the processing in Step S1602 and Step S1603 described above for all the selected decision models and selected delay increasing points (Step S16031 and Step S16032). From the above, the service record-based training data creation processing ends.

<Conclusion>

As described above, the train traffic management system 100 of the present embodiment stores a decision model for each determination station in which the service status of each of a delayed train and a to-be-delayed train to be delayed due to the delayed train and a coping method for the status (whether to make a service plan change or not and train service plan change content for recovering the delay of the to-be-delayed train when a change is made) are associated with each other, identifies, from a train service status estimated by a train service simulation, a determination station under the service status, and inputs the estimated service status to the above-mentioned decision model associated with the identified determination station, to thereby create a service plan change proposal based on the delay status of a train to be delayed due to another train that uses the determination station (or create no service plan change proposal).

Here, when determining the necessity and content of a service plan change due to a train delay, the operator or the like who performs train service management focuses on, of a plurality of stations that each train uses, for example, a station at which a to-be-delayed train may be delayed due to a delayed train (determination station) and determines the necessity of a service plan change such as a shunting station change and change content on the basis of the train service status of each of the delayed train and the to-be-delayed train. In the service plan change proposal creation processing of the present embodiment, similar to this, a station at which a to-be-delayed train may be delayed due to a delayed train (determination station) is detected, and a service plan change proposal is created on the basis of a determination using a decision model (corresponding to the determination station) in which the service status of each of the delayed train and the to-be-delayed train and train service plan change content for recovering the delay of the to-be-delayed train are associated with each other. The service plan change proposal creation processing therefore follows the determination process by the operator or the like.

With this, even when a service plan change (for example, a timetable revision or a temporary service plan change) has been made to change a train service form, a service plan change proposal can be created without a decision model modification based on the change or the preparation of a decision model for each schedule.

Further, since a decision model common to a plurality of trains is constructed for each delay-related station (determination station) unlike the related art in which a decision model is constructed for each train and each station, the amount of training data (past service plan change record) for the machine learning of a single decision model can be increased from the related art, so that the accuracy of the decision model can thus be enhanced.

Modified Example

The present invention is not limited to the embodiment described above and includes various modified examples. The embodiment has been specifically described above to make it easy to understand the present invention and is not necessarily limited to including all the described components.

For example, in the embodiment, the train traffic management system 100 includes the service plan change assistance apparatus 110 and the decision model creation apparatus 120. The embodiment of the present invention is, however, not limited to this. The offline decision model creation apparatus 120 isolated from the train traffic management system 100 may create the decision model database 340 and forward, as needed (on a regular basis, for example, once a month), the created decision model to the service plan change assistance apparatus 110 via a predetermined communication network or storage medium, to thereby update the decision model database 260.

Further, the structure of the feature vector 500 is not limited to the one described in the present embodiment. For example, the feature vector 500 may be provided with the element of the service information vector of a train preceding or following a delayed train or a to-be-delayed train, or may further have elements that the operator considers when changing a service plan, such as information on a company to which a vehicle belongs, whether a service has actually been provided or not (a case where the "estimated time," "departure delay time," or the like of a certain train at a certain station is information obtained from a service record at the time point of a reference time is defined as "actually provided," and a case where the "estimated time," "departure delay time," or the like of a certain train at a certain station is obtained as information estimated by a train service simulation since a service record has not been confirmed at the time point of the reference time is defined as "not actually provided"), or whether a station is a starting station or not.

Further, in the embodiment, the configuration for creating a decision model to create a service plan change proposal is described by taking the pattern in which a shunting station change is made as an example. The configuration of a decision model and a service plan change proposal creation method are, however, not limited to this. In the present invention, a problem of creating a service plan change proposal is handled as a classification problem, and hence a decision model therefor is a model that determines "which class of some classes (choices) an input feature vector plausibly belongs to." Thus, a decision model having another configuration that handles, for example, "whether to make a service plan change (of a particular pattern) or not" or "a service plan change of which pattern is made (or a service plan change of any pattern is not made)" as a classification problem may be created, to thereby create a service plan change proposal.

For example, when a classification into a plurality of disruption patterns is determined by a single decision model, the feature vector 500 and the output vector 700 may be structured to create a decision model for those plurality of disruption patterns. With regard to the feature vector 500, for example, all elements included in any of the feature vectors 500 corresponding to the respective disruption patterns are enumerated and a vector including all of those elements is regarded as the feature vector 500. In other words, a vector obtained by coupling the feature vectors 500 corresponding to the respective patterns to each other and removing duplicate elements may be regarded as a feature vector.

Further, the same holds true for the output vector 700. When a classification into a plurality of disruption patterns is determined by a single decision model, the output vector 700 including elements corresponding to the respective classes of a classification by the decision model into the plurality of disruption patterns without duplication is created. Moreover, the output vector 700 may have an element corresponding to a class "there is a service plan change (classification unknown)" so that the fact "some measures have been taken although it is unknown what service plan change has been made" may be presented to the operator.

Further, when a classification into a plurality of disruption patterns is determined by a single decision model, the value of each element, that is, the accuracy rate of the output vector 700 may be referred to, thereby relatively evaluating the matching degrees of a plurality of coping methods for a disruption status represented by the feature vector 500. For example, service plan change proposals corresponding to a predetermined number of classes are output in descending order of accuracy rate to prompt the operator to make a selection.

Further, after service plan change pattern candidates have been extracted by a decision model that determines "a service plan change of which pattern is made (or a service plan change of any pattern is not made)," a decision model that determines "whether to make a service plan change or not" may further be applied to each disruption pattern indicated by the extracted candidates, to thereby identify a service plan change proposal to be output ultimately.

Further, when, at a certain determination station, a plurality of service disruption patterns (for example, the change of the departure and arrival order of trains and the change of the order of trains that start from the station) may occur at the same time, a decision model may have a class in which the service disruption patterns are dealt with at the same time.

Further, in the embodiment, the example in which the service plan change assistance apparatus 110 creates and displays a service plan change proposal to prompt the operator to make a service plan change. However, the service plan change assistance apparatus 110 may automatically change a service plan without the operator. For example, the service plan change execution portion 240 may automatically create, when the accuracy rate of a created service plan change proposal exceeds a predetermined value, the new service plan 272 on the basis of the service plan change proposal. With this, the time and effort of the operator in confirming the content of a service plan change proposal can be reduced.

Further, in the embodiment, the decision model includes a neural network using a softmax function as the activation function for the output layers. Another configuration may, however, be employed. For example, when not a classification problem with a multiple value but a binary classification problem is addressed, the decision model may include a neural network using a sigmoid function as the activation function for the output layers. Moreover, when a sufficient amount of training data is not obtained, for example, other techniques for finding a solution for a classification problem by supervised learning including the technique of ensemble learning may be used.

From the above description herein, at least the following matters are revealed. That is, in the service plan change assistance apparatus 110 of the present embodiment, the arithmetic apparatus may output information on the certainty factor of the created service plan change proposal.

In this way, information on the certainty factor (for example, accuracy rate) of a service plan change proposal is output, so that the operator or the like can determine whether to employ a created service plan change proposal or not.

Further, in the service plan change assistance apparatus 110 of the present embodiment, the arithmetic apparatus may execute, when the certainty factor of the created service plan change proposal exceeds a predetermined threshold, service plan change execution processing of creating a new train service plan on the basis of the created service plan change proposal.

In this way, when the certainty factor of a service plan change proposal is high, a new train service plan can be automatically created on the basis of the service plan change proposal, so that the time and effort of the operator or the like in confirming the content of a service plan change proposal can be saved and appropriate train route control can be performed.

Further, in the service plan change assistance apparatus 110 of the present embodiment, the arithmetic apparatus may output, on the basis of the certainty factor of each of a plurality of created service plan change proposals, information on a service plan change proposal with the certainty factor exceeding a predetermined threshold.

In this way, information on a service plan change proposal with a high certainty factor of a plurality of service plan change proposals is output, so that the operator or the like can grasp only an appropriate service plan change proposal from a plurality of service plan change proposal candidates and thus perform a train service management task promptly.

Further, in the service plan change assistance apparatus 110 of the present embodiment, the storage apparatus may store a decision model in which the service status of each of a delayed train and a to-be-delayed train to be delayed due to the delayed train and a plurality of types of train service plan change content for recovering the delay of the to-be-delayed train are associated with each other, in association with a station at which the to-be-delayed train is delayed due to the delayed train, and in the service plan change proposal creation processing, the arithmetic apparatus may create a plurality of service plan change proposals on the basis of the decision model and output the certainty factor of each of the plurality of created service plan change proposals in an order based on the value of the certainty factor.

In this way, a plurality of service plan change proposals are created using a decision model including a plurality of types of train service changes and displayed in an order based on the value of the certainty factor (for example, in descending order of certainty factor), so that the operator or the like can grasp a plurality of applicable service plan change proposals all at once and thus make a determination on a train service task more promptly.

Further, in the service plan change assistance apparatus 110 of the present embodiment, the arithmetic apparatus may output information corresponding to the created service plan change proposal and regarding the identified station and a delayed train or a to-be-delayed train standing at the station.

In this way, information corresponding to a created service plan change proposal and regarding a determination station and a train standing at the determination station is displayed, so that the operator or the like can grasp information on a station or a train that is the cause of (the basis for) a service plan change. With this, the operator or the like can make an appropriate determination on whether to make a train service plan change or not.

Further, in the service plan change assistance apparatus 110 of the present embodiment, the storage apparatus may store a decision model in which the service status of each of a delayed train and a to-be-delayed train to be delayed due to the delayed train and the change content of the shunting station for the delayed train for recovering the delay of the to-be-delayed train are associated with each other, in association with a station at which the to-be-delayed train is delayed due to the delayed train, in the delay increasing point identification processing, the arithmetic apparatus may identify, from the estimated train service status, a set of the delayed train, the to-be-delayed train to be delayed due to the delayed train, and a station at which the delay of the to-be-delayed train increases due to the delayed train as a delay increasing point, and in the service plan change proposal creation processing, the arithmetic apparatus may input information on the estimated train service status to a decision model associated with the delay increasing point, to thereby create information indicating the change content of the shunting station for the delayed train related to the delay increasing point as the service plan change proposal.

In this way, on the basis of a decision model related to the service status of each of a delayed train and a to-be-delayed train and a determination station at which how much the to-be-delayed train is influenced by the delay of the delayed train is grasped, a shunting station corresponding to the service status of the train can be identified to create a service plan change proposal, so that an appropriate change of the shunting station for the delayed train or the to-be-delayed train effective for the avoidance of small disruptions and medium disruptions of a train service can be made to achieve a stable train service.

Moreover, in the present embodiment, the decision model creation apparatus 120 includes the arithmetic apparatus that executes: the training data creation processing of creating, by focusing on a station at which a to-be-delayed train is influenced by the delay of a delayed train, training data including the delay status of each of the delayed train and the to-be-delayed train to be delayed due to the delayed train and train service plan change content; and the parameter adjustment processing of creating, on the basis of the created training data, a decision model in which the service status of each of the delayed train and the to-be-delayed train to be delayed due to the delayed train and train service plan change content for recovering the delay of the to-be-delayed train are associated with each other, in association with the station at which the to-be-delayed train is influenced by the delay of the delayed train.

In this way, with a decision model that reproduces, by focusing on a station at which a to-be-delayed train is influenced by the delay of a delayed train, the determination process by the operator or the like in determining the necessity and content of a service plan change on the basis of the train service status of each of the delayed train and the to-be-delayed train, even when a service plan change (for example, a timetable revision or a temporary service plan change) has been made to change a train service form, a service plan change can be made without a decision model modification based on the change or the preparation of a decision model for each schedule.

Further, in the decision model creation apparatus 120, in the training data creation processing, the arithmetic apparatus may create, by focusing on a station at which a to-be-delayed train is influenced by the delay of a delayed train, training data including the delay status of each of the delayed train and the to-be-delayed train to be delayed due to the delayed train and the change content of the shunting station for the delayed train for recovering the delay of the to-be-delayed train, and in the parameter adjustment processing, the arithmetic apparatus may create a decision model in which the service status of each of the delayed train and the to-be-delayed train to be delayed due to the delayed train and the change content of the shunting station for the delayed train for recovering the delay of the to-be-delayed train are associated with each other, in association with the station at which the to-be-delayed train is influenced by the delay of the delayed train.

In this way, with a decision model that reproduces the determination process by the operator or the like in determining a shunting station on the basis of the train service status of each of a delayed train and a to-be-delayed train, a shunting station corresponding to the service status of the train can be identified to create a service plan change proposal, so that a train shunting station change effective for the avoidance of small disruptions and medium disruptions of a train service can be made.

Moreover, in the present embodiment, the train traffic management system 100 includes: the service plan change assistance apparatus including the storage apparatus that stores a decision model in which the service status of each of a delayed train and a to-be-delayed train to be delayed due to the delayed train and train service plan change content for recovering the delay of the to-be-delayed train are associated with each other by focusing on a station at which the to-be-delayed train is influenced by the delay of a delayed train, in association with the station at which the to-be-delayed train is influenced by the delay of the delayed train, and the arithmetic apparatus that executes the train service simulation processing of estimating a future train service status on the basis of a train service plan and a train service record in a period before a current time, the delay increasing point identification processing of identifying, from the estimated train service status, the station at which the to-be-delayed train to be delayed due to the delayed train is standing (that is, the station at which the to-be-delayed train is influenced by the delay of the delayed train), and the service plan change proposal creation processing of inputting information on the estimated train service status to a decision model associated with the identified station to create a service plan change proposal that includes information indicating train service change content for recovering the delay of the to-be-delayed train at the identified station, and outputting the created service plan change proposal; and the route control apparatus that controls a train run on the basis of the created new service plan.

In this way, the run of the train 106 is controlled on the basis of a train service plan created using a decision model, so that the expansion of train service disruptions can be stably prevented independently of the content of the service plan.

REFERENCE SIGNS LIST

100: Train traffic management system
110: Service plan change assistance apparatus
120: Decision model creation apparatus

The invention claimed is:

1. A service plan change assistance apparatus included in a train traffic management system, the service plan change assistance apparatus comprising:
    a storage apparatus that stores a decision model in which a service status of each of a delayed train and a to-be-delayed train to be delayed due to the delayed train, an increment of a delayed time of the to-be-delayed train that is delayed due to the delayed train on a basis of a delayed time of the to-be-delayed train in a case where the delayed train is not delayed, and train service plan change content for recovering a delay of the to-be-delayed train are associated with each other, in association with a station at which the to-be-delayed train is delayed due to the delayed train; and
    a processor coupled to a memory storing instructions, the processor executes:
        train service simulation processing of estimating a future train service status based on a train service plan and a train service record before a current time;
        delay increasing point identification processing of identifying, from the estimated train service status, the station at which the to-be-delayed train is delayed due to the delayed train; and
        service plan change proposal creation processing of inputting an increment of a delayed time of the to-be-delayed train that is delayed due to the delayed train on the basis of a delayed time of the to-be-delayed train in the case where the delayed train is not delayed and information on the estimated train service status to a decision model associated with the identified station to create a service plan change proposal that includes information indicating train service change content for reducing a delay of the to-be-delayed train at the identified station, and outputting the created service plan change proposal, such that a route control apparatus of the train traffic management system controls a train by the service plan that reflects the created service plan change proposal that is outputted.

2. The service plan change assistance apparatus according to claim 1, wherein the processor outputs information on a certainty factor of the created service plan change proposal.

3. The service plan change assistance apparatus according to claim 1, wherein the processor executes, when a certainty factor of the created service plan change proposal exceeds a predetermined threshold, service plan change execution processing of creating a new train service plan based on the created service plan change proposal.

4. The service plan change assistance apparatus according to claim 1, wherein the processor outputs, based on a certainty factor of each of a plurality of the created service plan change proposals, information on a service plan change proposal with the certainty factor exceeding a predetermined threshold.

5. The service plan change assistance apparatus according to claim 2, wherein
    the storage apparatus stores the decision model in which the service status of each of the delayed train and the to-be-delayed train to be delayed due to the delayed train, the increment of the delayed time of the to-be-delayed train that is delayed due to the delayed train on the basis of the delayed time of the to-be-delayed train in the case where the delayed train is not delayed, and a plurality of types of the train service plan change content for recovering the delay of the to-be-delayed train are associated with each other, in association with the station at which the to-be-delayed train is delayed due to the delayed train, and
    the processor:
    in the service plan change proposal creation processing, creates a plurality of the service plan change proposals based on the decision model and outputs each of the plurality of created service plan change proposals in an order based on a value of the certainty factor.

6. The service plan change assistance apparatus according to claim 1, wherein the processor outputs information corresponding to the created service plan change proposal and regarding the identified station and the delayed train delaying the to-be-delayed train at the station or the to-be-delayed train delayed due to the delayed train at the station.

7. The service plan change assistance apparatus according to claim 1, wherein
    the storage apparatus stores the decision model in which the service status of each of the delayed train and the to-be-delayed train to be delayed due to the delayed train, the increment of the delayed time of the to-be-delayed train that is delayed due to the delayed train on the basis of the delayed time of the to-be-delayed train in the case where the delayed train is not delayed, and change content of a shunting station for the delayed train for recovering the delay of the to-be-delayed train are associated with each other, in association with the station at which the to-be-delayed train is delayed due to the delayed train, and the processor:

in the delay increasing point identification processing, identifies, from the estimated train service status, a set of the delayed train, the to-be-delayed train to be delayed due to the delayed train, and a station at which the delay of the to-be-delayed train increases due to the delayed train as a delay increasing point; and in the service plan change proposal creation processing, inputs the increment of the delayed time of the to-be-delayed train that is delayed due to the delayed train on the basis of the delayed time of the to-be-delayed train in the case where the delayed train is not delayed, and the information on the estimated train service status to a decision model associated with the delay increasing point, to thereby create information indicating change content of the shunting station for the delayed train related to the delay increasing point as the service plan change proposal.

8. A train traffic management system comprising:

a service plan change assistance apparatus including:

a storage apparatus that stores a decision model in which a service status of each of a delayed train and a to-be-delayed train to be delayed due to the delayed train, an increment of a delayed time of the to-be-delayed train that is delayed due to the delayed train on a basis of a delayed time of the to-be-delayed train in a case where the delayed train is not delayed, and train service plan change content for recovering a delay of the to-be-delayed train are associated with each other, in association with a station at which the to-be-delayed train is delayed due to the delayed train;

an arithmetic apparatus that a processor coupled to a memory storing instructions, the processor executes:

train service simulation processing of estimating a future train service status based on a train service plan and a train service record in a period before a current time;

delay increasing point identification processing of identifying, from the estimated train service status, the station at which the to-be-delayed train to be delayed due to the delayed train is standing;

service plan change proposal creation processing of inputting an increment of a delayed time of the to-be-delayed train that is delayed due to the delayed train on the basis of a delayed time of the to-be-delayed train in the case where the delayed train is not delayed and information on the estimated train service status to a decision model associated with the identified station to create a service plan change proposal that includes information indicating train service change content for recovering a delay of the to-be-delayed train at the identified station, and outputting the created service plan change proposal; and a route control apparatus that controls a train by the service plan that reflects the created service plan change proposal that is outputted.

* * * * *